United States Patent
Topliss

(10) Patent No.: US 9,134,503 B2
(45) Date of Patent: Sep. 15, 2015

(54) VCM OIS ACTUATOR MODULE

(71) Applicant: Apple Inc., Cupertino, CA (US)

(72) Inventor: Richard J. Topliss, Campbell, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 13/660,725

(22) Filed: Oct. 25, 2012

(65) Prior Publication Data

US 2014/0009631 A1    Jan. 9, 2014

Related U.S. Application Data

(60) Provisional application No. 61/668,612, filed on Jul. 6, 2012.

(51) Int. Cl.
*G02B 7/08* (2006.01)
*G02B 27/64* (2006.01)
*H04N 5/232* (2006.01)
*G03B 3/10* (2006.01)
*G03B 5/00* (2006.01)
*H04N 5/225* (2006.01)

(52) U.S. Cl.
CPC ............... *G02B 7/08* (2013.01); *G02B 27/646* (2013.01); *G03B 3/10* (2013.01); *G03B 5/00* (2013.01); *H04N 5/2254* (2013.01); *H04N 5/2257* (2013.01); *H04N 5/23287* (2013.01); *G03B 2205/0007* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 6,307,678 B2 * | 10/2001 | Kosaka et al. | 359/557 |
| 2001/0004420 A1 * | 6/2001 | Kuwana et al. | 396/55 |
| 2001/0022688 A1 * | 9/2001 | Kosaka et al. | 359/557 |
| 2006/0028320 A1 * | 2/2006 | Osaka | 340/384.1 |
| 2006/0181970 A1 * | 8/2006 | Miyagi | 369/44.14 |
| 2006/0204242 A1 * | 9/2006 | Gutierrez et al. | 396/439 |
| 2008/0088954 A1 * | 4/2008 | Takahashi | 359/813 |
| 2009/0034950 A1 * | 2/2009 | Takagi et al. | 396/55 |
| 2009/0047009 A1 * | 2/2009 | Nagano | 396/55 |
| 2009/0059373 A1 * | 3/2009 | Lam et al. | 359/557 |
| 2009/0129764 A1 * | 5/2009 | Hayashi et al. | 396/55 |
| 2009/0322927 A1 * | 12/2009 | Ito et al. | 348/335 |

(Continued)

FOREIGN PATENT DOCUMENTS

JP    2009128841    6/2009
TW    1303512    11/2008

OTHER PUBLICATIONS

PCT International Search Report for PCT/US2013/047097, mailed Sep. 24, 2013.

(Continued)

*Primary Examiner* — Michael Osinski
(74) *Attorney, Agent, or Firm* — Blakely, Sokoloff, Taylor & Zafman LLP

(57) ABSTRACT

A lens actuator module including an autofocus (AF) mechanism capable of moving a lens according to at least three degrees of freedom and an optical image stabilization (OIS) mechanism capable of moving the lens according to at least two degrees of freedom. The AF mechanism may have a coil and a magnet assembly for driving movement of the lens according to the at least three degrees of freedom. The optical image stabilization (OIS) mechanism may include a coil and a magnet assembly for driving movement of the lens according to the at least two degrees of freedom.

12 Claims, 18 Drawing Sheets

(56) References Cited

U.S. PATENT DOCUMENTS

| | | | |
|---|---|---|---|
| 2010/0080545 A1* | 4/2010 | Fan et al. | 396/55 |
| 2010/0149666 A1* | 6/2010 | Liao | 359/824 |
| 2010/0177621 A1* | 7/2010 | Wakabayashi et al. | 369/112.23 |
| 2010/0232161 A1 | 9/2010 | Aschwanden et al. | |
| 2010/0316363 A1* | 12/2010 | Chou | 396/55 |
| 2011/0013895 A1* | 1/2011 | Chiang | 396/55 |
| 2011/0096178 A1* | 4/2011 | Ryu et al. | 348/208.2 |
| 2011/0102606 A1* | 5/2011 | Toyomura et al. | 348/207.1 |
| 2011/0235196 A1* | 9/2011 | Ke | 359/824 |
| 2011/0286099 A1 | 11/2011 | Shiraki et al. | |
| 2012/0082442 A1 | 4/2012 | Kwon et al. | |
| 2012/0092768 A1* | 4/2012 | Shiraki et al. | 359/557 |
| 2012/0099201 A1 | 4/2012 | Chan et al. | |
| 2012/0120297 A1* | 5/2012 | Gutierrez | 348/335 |
| 2012/0121242 A1* | 5/2012 | Gutierrez et al. | 396/133 |
| 2012/0147258 A1* | 6/2012 | Park | 348/374 |
| 2012/0154614 A1 | 6/2012 | Moriya et al. | |
| 2012/0162790 A1* | 6/2012 | Chiang | 359/824 |
| 2012/0229901 A1* | 9/2012 | Moriya et al. | 359/557 |
| 2013/0208369 A1* | 8/2013 | Lam | 359/824 |
| 2013/0222685 A1* | 8/2013 | Topliss et al. | 348/373 |
| 2014/0091204 A1* | 4/2014 | Ezawa et al. | 250/208.1 |
| 2014/0092493 A1* | 4/2014 | Topliss | 359/824 |

OTHER PUBLICATIONS

Taiwanese Office Action mailed Sep. 22, 2014, TW Appln. No. 102124286, with English-language translation, 6 pages.

International Preliminary Report on Patentability for PCT/US2013/047097, mailed Jan. 15, 2015, 7 pages.

* cited by examiner

VCM OIS ACTUATOR MODULE

CROSS-REFERENCE TO RELATED APPLICATIONS

The application claims the benefit of the earlier filing date of U.S. Provisional Patent Application No. 61/668,612, filed Jul. 6, 2012 and incorporated herein by reference.

FIELD

An embodiment of the invention is directed to an actuator module for a camera that may be integrated within a mobile electronic device such as a smart phone. Other embodiments are also described and claimed.

BACKGROUND

Miniature cameras are becoming increasingly common in mobile electronic devices such as smartphones. There is a constant drive to improve performance of such cameras, while still maintaining the same envelope. Demands on improvements to performance of such miniature cameras are constant, as are demands for continued miniaturization, given the added features and devices added to such mobile electronic devices. In particular, high image quality requires the lens motion along the optical axis to be accompanied by minimal parasitic motion in the other degrees of freedom, particularly tilt about axes orthogonal to the optical axis. This requires the suspension mechanism to be stiff to such parasitic motions. However, given the need to control the lens position with a resolution of 1 micron, such suspension mechanisms must account for friction. Further to this, there is a strong desire, for a given size of camera, to fit bigger lenses and image sensors to improve image quality, and hence there is a desire to reduce the size of components such as actuators.

One feature augmentation that is now standard in such miniature cameras is autofocus (AF) whereby the object focal distance is adjusted to allow objects at different distances to be in sharp focus at the image plane and captured by the digital image sensor. There have been many ways proposed for achieving such adjustment of focal position, however most common is to move the whole optical lens as a single rigid body along the optical axis. Positions of the lens closer to the image sensor correspond to object focal distances further from the camera.

The incumbent actuator technology for such cameras is the voice coil motor (VCM). The VCM technology, as compared to other proposed technologies, has the key advantage of being simple, and therefore being straightforward to design. For such actuators, a current carrying conductor in a magnetic field experiences a force proportional to the cross product of the current in the conductor and the magnetic field, this is known as the Lorentz force. The Lorentz force is greatest if the direction of the magnetic field is orthogonal to the direction of the current flow, and the resulting force on the conductor is orthogonal to both. The Lorentz force is proportional to the magnetic field density and the current through the conductor. Coils of the conductor are used to amplify the force. For actuator operation, either the magnet (or more typically magnets) or the coil is mounted on a fixed support structure, while the other of the magnet (or magnets) or coil is mounted on the moving body, whose motion is being controlled by the actuator.

Successful actuators have been designed both ways around (i.e., with the magnets fixed or the coil fixed), however, the more usual configuration is where the magnets are fixed, and the coil is moving. Representatively, the coil is mounted around a lens carrier or, in some cases, the lens itself. This is the most desirable configuration because the relatively heavy magnets are stationary, and hence their inertia can be avoided. The moving lens carrier is attached to the fixed support structure by an attachment mechanism that allows the lens carrier to move substantially along the optical axis, without parasitic motions, while resisting the Lorentz force of the actuator. In this way the Lorentz 'force' is translated into a lens carrier 'displacement' by the attachment mechanism.

Another feature augmentation that is desirable in miniature cameras is optical image stabilization (OIS). OIS is a mechanism that stabilizes an image, which may be unstable due to user handshake, by varying the optical path to the sensor. The incorporation of OIS into current miniature camera VCM actuator architecture, however, has been impractical due to compromises between size, power and performance.

SUMMARY

An embodiment of the invention is an actuator module suitable for use in a camera, more specifically, a miniature camera. The actuator module may include a mechanism to provide an AF function and a mechanism to provide an OIS function. In one embodiment, the AF mechanism may be configured with four separate magnets and four separate coils positioned around a lens carrier. Each coil can deliver a force on one corner of the lens carrier along the optical axis. In this way, if the four coils are driven appropriately with a common mode current they can provide the forces needed to focus the lens. However, if driven differentially, they can actively tilt the lens to compensate for parasitic lens tilt.

The actuator module further incorporates an OIS mechanism configured to shift the lens carrier (and, in one embodiment, the AF mechanism attached to the lens carrier) in directions orthogonal to the optical axis. Such motions can substantially correct for handshake motions in the center of the image. Using this method of OIS, the associated image sensor substrate can remain stationary, substantially simplifying the camera manufacture, size and packaging in the mobile handheld device. The OIS mechanism may include, among other features, four separate coils and four separate magnets positioned at corners of an OIS base member. The OIS base member may be dimensioned to be positioned below the lens carrier. The OIS coils may be positioned orthogonal to the AF coils so that they shift the lens carrier in directions orthogonal to the optical axis.

The combination of the AF mechanism and OIS mechanism within a single actuator module allows the actuator module to modify the position of the lens relative to the image sensor along five different axes (i.e., 5 degrees of freedom (DOF)). Representatively, the lens may be shifted or translated along at least three different axes and rotated about at least two different axes. For example, the AF mechanism and/or the OIS mechanism may move the lens linearly in a direction parallel to the optical axis (DOF1), linearly in a direction parallel to a first lateral axis orthogonal to the optical axis (DOF2), linearly in a direction parallel to a second lateral axis orthogonal to the first lateral axis and to the optical axis (DOF3), rotate the lens about the first lateral axis (DOF4) and/or rotate the lens about the second lateral axis (DOF5).

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1:
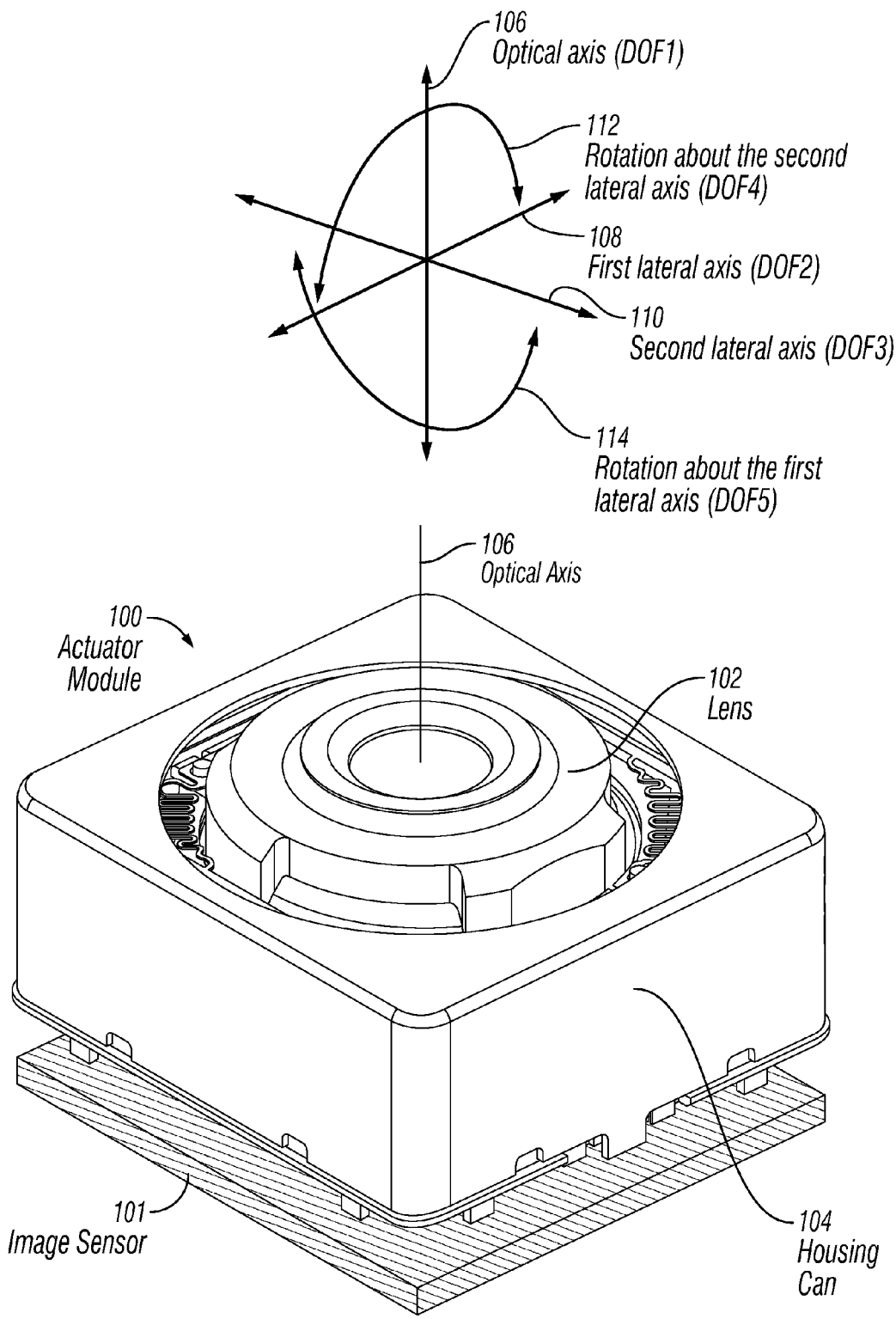
FIG. 1 is a perspective view of one embodiment of an actuator module.

The present invention makes use of VCM technology and presents an actuator architecture having improved power consumption, performance, reduced size, and extra functionality, including OIS. FIG. 1 illustrates a perspective view of one embodiment of an actuator module. Actuator module 100 may have integrated therein a mechanism to provide the AF function and a mechanism to provide the OIS function. The AF mechanism is configured to both move the lens along the optical axis and actively tilt the lens. The lens tilt may be used to compensate for parasitic lens movements due to, for example, tilting of the device within which actuator module 100 is implemented (e.g., mobile electronic device 1100 illustrated in FIG. 11). The OIS mechanism is configured to move (e.g., shift) the lens in directions orthogonal to the optical axis to correct for handshake motions in the center of the image. By shifting, as opposed to tilting the entire camera (e.g., the lens and image sensor together as a rigid body), the associated image sensor substrate 101 can remain stationary, substantially simplifying both camera manufacture, size and packaging in the mobile electronic device. In particular, if the entire camera is tilted, a separate space must be added beneath the image sensor substrate to account for this movement. This, in turn, increases the size of the camera and introduces the difficult task of getting multiple electrical connections off the moving image sensor substrate without reducing OIS performance. It is contemplated, however, that in other embodiments, the whole camera including the lens and image sensor may be tilted together using the AF and OIS mechanisms.

In effect, actuator module 100 is able to control the position of lens 102 relative to the image sensor 101 in five axes (i.e., 5 degrees of freedom (DOF)). In other words, actuator module 100 can both shift and tilt lens 102 to achieve both AF and correct for any image distortion due to the shifting OIS function. The 5 degrees of freedom are as follows: linear position along the optical axis (DOF1) as illustrated by arrow 106, linear position along a first lateral axis orthogonal to the optical axis (DOF2) as illustrated by arrow 108, linear position along a second lateral axis orthogonal to the first lateral axis and to the optical axis (DOF3) as illustrated by arrow 110, rotation about a first axis orthogonal to the optical axis (DOF4) as illustrated by arrow 112 and rotation about a second axis orthogonal to the first axis and to the optical axis (DOF5) as illustrated by arrow 114. The first axis of DOF4 and the second axis of DOF5 may be the same or different than the first lateral axis of DOF2 and the second lateral axis of DOF3, respectively.

It is noted that a sixth DOF, which is rotation about the optical axis illustrated by arrow 106, is also possible. The sixth DOF may be useful, for example, in embodiments where the lens is not rotationally symmetrical about the optical axis illustrated by arrow 106.

During operation, lens 102 may be moved linearly (e.g., shifted), tilted and/or rotated about any one or more of the axes illustrated in FIG. 1 using actuator module 100. Representatively, in one embodiment, lens 102 may shifted in a direction parallel to the optical axis 106, tilted about axes orthogonal to the optical axis (e.g., axis 108 or axis 110), and rotated about an appropriate center of rotation (e.g., rotated as illustrated by arrow 112 and/or arrow 114) to achieve a desired AF or OIS position.

The addition of the controllable lens tilt DOFs provides several advantages. For example, during a factory calibration of actuator module 100, offset currents can be applied to the AF coils, as will be described in more detail below, to tilt lens 102 and hence compensate for any static tilt errors between lens 102 and the associated image sensor 101. Such static tilt errors may be due to manufacturing variations caused by part and assembly tolerances. In addition, as the orientation of the camera, within which actuator module 100 is implemented, is changed, the lens may tilt parasitically relative to the image sensor. This may occur where the lens is suspended on a resilient spring flexure and the lens center of gravity is not located at the point that would apply balanced loads to the spring flexures. By making use of an accelerometer found in the electronic device in which actuator module 100 is implemented, to determine the orientation of the camera, it is possible to provide offset currents to the coils to compensate for the tilt and maintain low tilt between lens 102 and the associated image sensor 101.

Actuator module 100 may be enclosed within a housing 104 as further illustrated in FIG. 1. Housing 104 may be a substantially hollow, rectangular structure dimensioned to contain each of the components of actuator module 100. In one embodiment, housing 104 may have a substantially circular opening through which lens 102 may be positioned and an open bottom such that it can be easily positioned over the components of actuator module 100. Housing 104 may be made of any material suitable for containing components of actuator module 100, for example, any substantially rigid material suitable for containing and protecting the components such as a substantially rigid plastic material.

In one embodiment, housing 104 may be, for example, a screening that encloses the AF and OIS mechanisms and provides drop-test end-stops limiting the motion of the mechanisms during impact. In this aspect, housing 104 may be made of a substantially rigid material, for example, a metal, such as deep-drawn steel, or injection molded plastic. In one embodiment, a metal screening may be used to minimize the material thickness. In the case of a metal screening, an insulating coating may further be provided to avoid electrical short-circuits to the various conduits, such as the springs.

Figure 2:
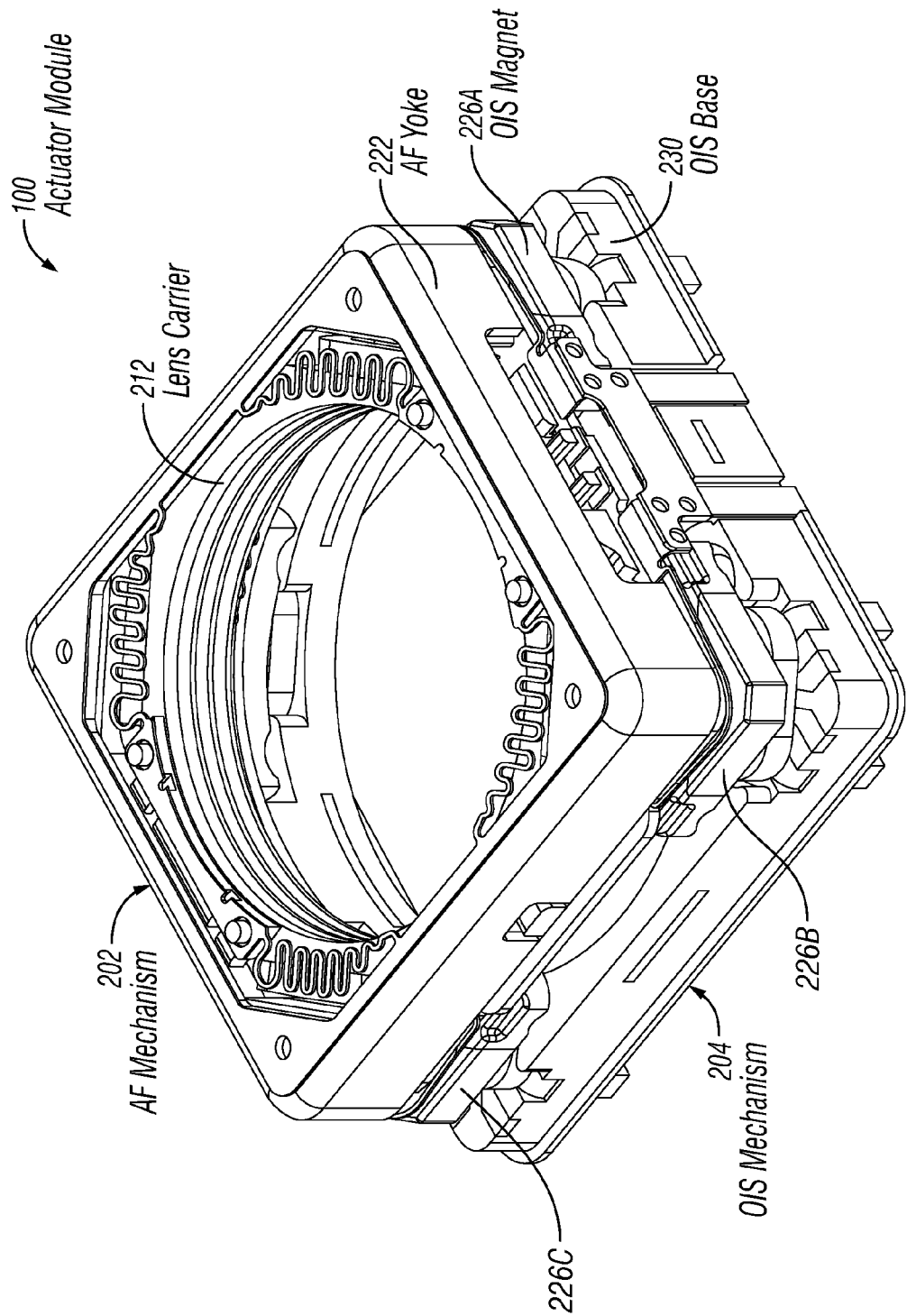
FIG. 2 is a perspective view of the internal components of one embodiment of an actuator module.

FIG. 2 illustrates a perspective view of one embodiment of actuator module 100 with housing 104 removed. From this view, it can be seen that AF mechanism 202 and OIS mechanism 204 are positioned one on top of the other. Representatively, as illustrated in FIG. 2, AF mechanism 202 is positioned on top of OIS mechanism 204. AF mechanism 202 may include lens carrier 212 mounted within AF yoke 222. Lens 102 may be mounted within lens carrier 212 such that movement of lens carrier 212 by AF mechanism 202 during an autofocus operation or OIS mechanism 204 during an OIS operation moves the associated lens 102. OIS mechanism 204 may include an OIS base 230 dimensioned to support each of the OIS mechanism components, for example, OIS magnets 226A, 226B, 226C positioned at each corner of OIS mechanism 204. In addition to supporting the various OIS components, OIS base 230 may also provide a support base along which AF mechanism 202 can shift during an OIS operation as will be described in more detail below. Each of the AF mechanism 202 and OIS mechanism 204 may have a substantially rectangular overall shape with substantially similar footprints such that they can be enclosed within housing 104 previously discussed in reference to FIG. 1.

The various components making up AF mechanism 202, according to one embodiment, will now be described in more detail in reference to FIGS. 3A-3D and FIGS. 4A-4F. More specifically, FIGS. 3A-3D illustrate various features of a moving portion of AF mechanism 202 which can be attached to, and is capable of moving with respect to, a fixed portion of AF mechanism 202. The fixed portion of AF mechanism 202 will be described in reference to FIGS. 4A-4F.

Figure 3A:
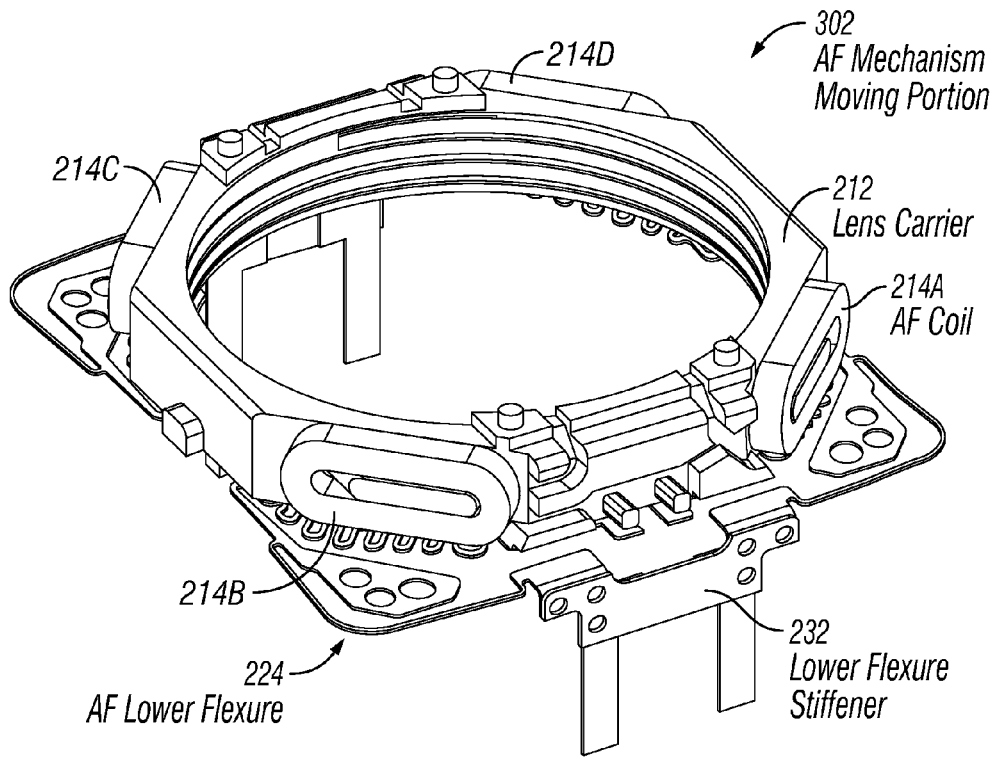
FIG. 3A is a perspective view of one embodiment of an autofocus mechanism moving portion.

FIG. 3A illustrates a top perspective view of one embodiment of an AF mechanism moving portion. When AF yoke 222 is removed, as illustrated in FIG. 3A, it can be seen that AF mechanism moving portion 302 includes lens carrier 212, AF coils 214A, 214B, 214C and 214D positioned around the circumference of lens carrier 212 and a lower flexure 224. A lower flexure stiffener 232 may further be attached to lower flexure 224. The lower flexure stiffener 232 may provide support to lower flexure 224 and also serve as a mounting bracket for mounting of AF mechanism moving portion 302 to OIS base 230 as illustrated in FIG. 2.

Figure 3B:
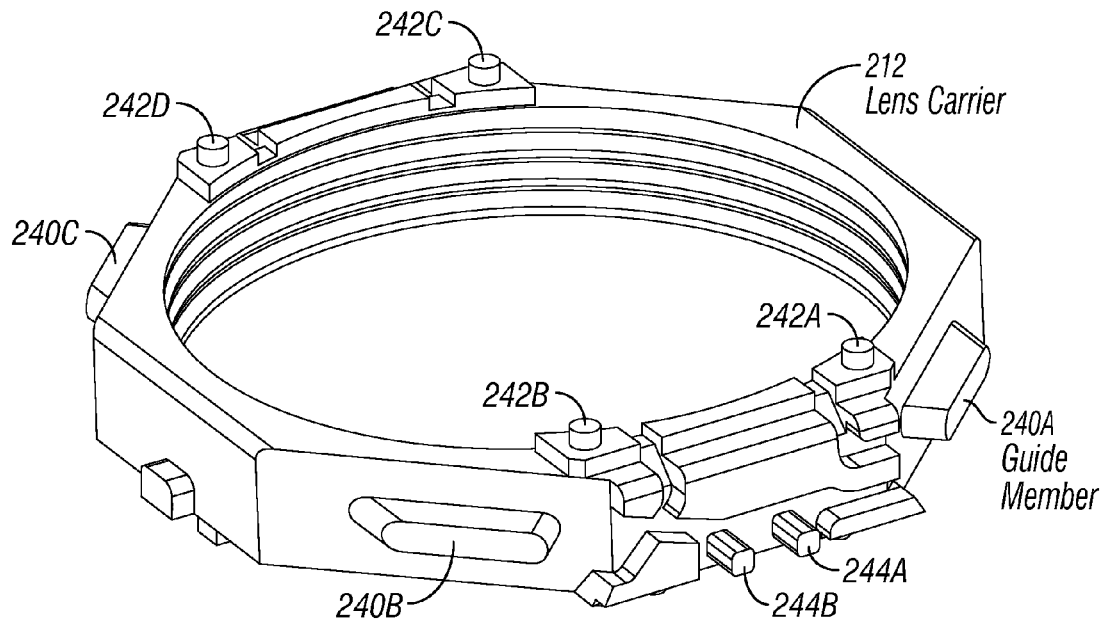
FIG. 3B is a perspective view of one embodiment of a lens carrier for an autofocus mechanism moving portion.
Figure 3C:
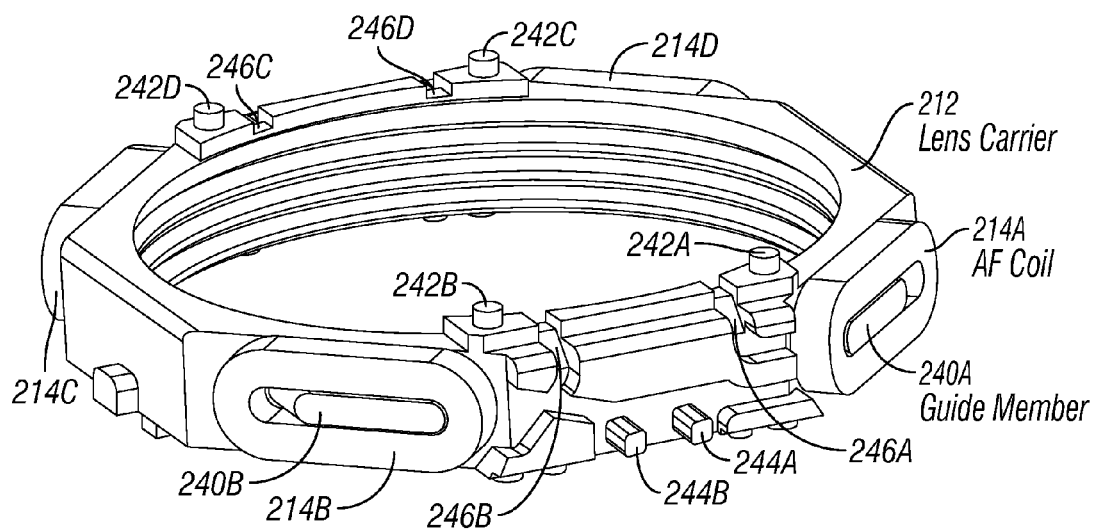
FIG. 3C is a perspective view of one embodiment of a lens carrier and coil configuration for an autofocus mechanism moving portion.

FIG. 3B illustrates a top perspective view of lens carrier 212 with the AF coils and lower flexure removed. From this view, it can be seen that lens carrier 212 is a substantially cylindrical structure dimensioned to support a lens (e.g., lens 102) and allow for movement of the lens along one or more of the desired degrees of freedom. In this aspect, lens carrier 212 may include an open center dimensioned to receive the lens and various guide and pin members dimensioned to connect lens carrier 212 to various components used to drive movement of lens carrier 212. Representatively, lens carrier 212 may have guide members 240A, 240B and 240C extending from its outer circumferential wall which are dimensioned to support AF coils 214A, 214B and 214C, respectively. It is noted that a fourth guide member (not shown), which is substantially similar to the illustrated guide members, is also provided along a back side of lens carrier 212 to support AF coils 214D. The guide members 240A, 240B and 240C are dimensioned to fit within an open center of each of AF coils 214A, 214B, 214C and 214D such that the coils are vertically oriented around lens carrier 212 as illustrated in FIG. 3A. This vertical orientation of AF coils 214A, 214B, 214C and 214D facilitates movement of lens carrier 212, and in turn the associated lens, in a direction parallel to an optical axis of the lens positioned therein during the AF operation (i.e., according to DOF1) and/or rotation or tilting of the lens along axis orthogonal to the optical axis (i.e., according to DOF4 or DOF5). Although not illustrated, the ends of the wires forming the AF coils 214A, 214B, 214C and 214D can be connected to external terminals, which can be wrapped onto pins 244A, 244B on two sides of the lens carrier 212. The other ends of the wires can be bonded into channels 246A, 246B, 246C and 246D formed within lens carrier 212 and brought to the top of the lens carrier 212 and folded into the middle of the part for later connection with the AF upper flexure 420 (see FIG. 4A).

Guide members 240A, 240B and 240C may be integrally formed with lens carrier 212 or may be separate structures attached to lens carrier 212 according to any suitable technique (e.g., bonding, welding, adhesive or the like). It is to be understood that although a specific number of guide members 240A, 240B and 240C (e.g., four) having particular geometric shapes are described and/or illustrated in FIG. 3B, any number of guide members 240A, 240B and 240C having any shape suitable for supporting AF coils 214A, 214B, 214C and 214D in the manner described are contemplated. In the illustrated embodiment, the guide members 240A, 240B, 240C and a fourth guide member (not shown) are evenly spaced around the outer circumference of lens carrier 212. It is contemplated, however, that in other embodiments, the guide members may be unevenly spaced with respect to one another around the circumference of lens carrier 212.

Figure 4A:
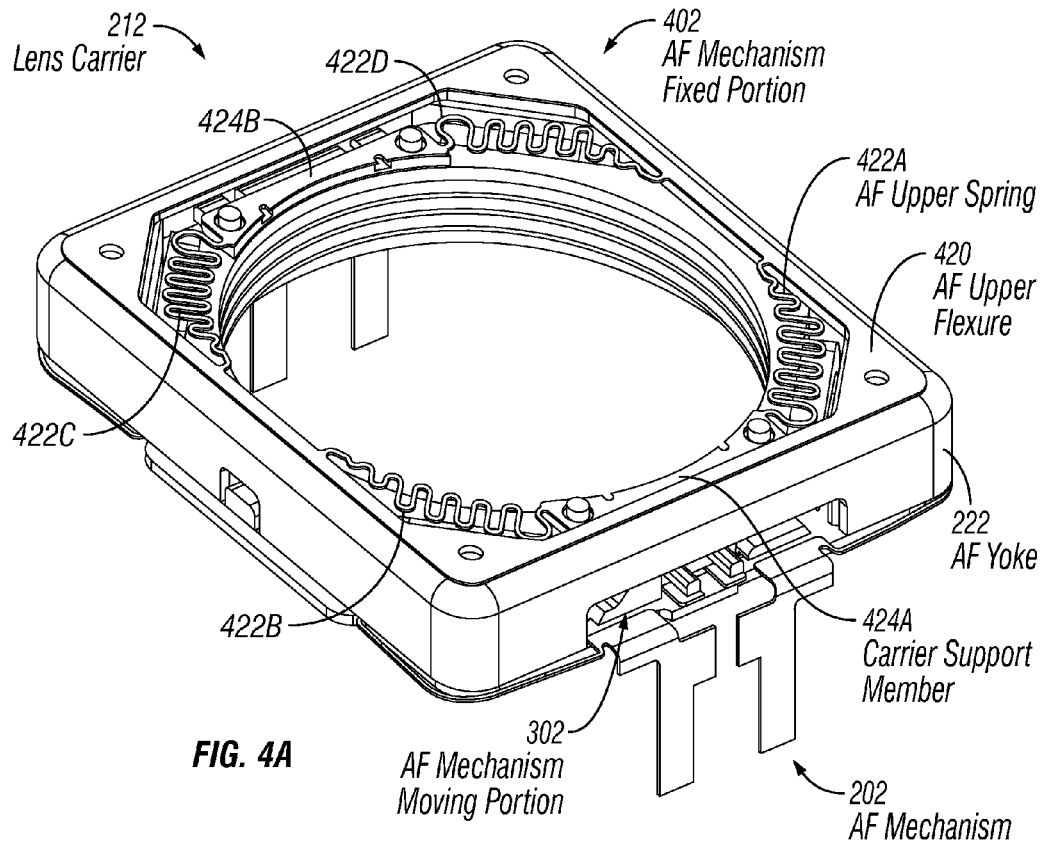
FIG. 4A is a perspective view of one embodiment of an autofocus mechanism moving portion attached to an autofocus mechanism fixed portion.

Lens carrier 212 may further include upper guide pins 242A, 242B, 242C and 242D extending from a top surface of lens carrier 212, which facilitate attachment of lens carrier 212 to an AF upper flexure, as will be described in more detail in reference to FIG. 4A. Lower guide pins 244A and 244B may further be provided along a circumference of lens carrier 212. Lower guide pins 244A and 244B may extend from the outer wall of lens carrier in a substantially perpendicular direction and be used to align lens carrier 212 with AF lower flexure 224 as illustrated in FIG. 3A. Upper guide pins 242A, 242B, 242C and 242D and/or lower guide pins 244A and 244B may be integrally formed with lens carrier 212 or may be separate structures attached to lens carrier 212 according to any suitable technique (e.g., bonding, welding, adhesive or the like). It is to be understood that although a specific number of upper guide pins 242A, 242B, 242C and 242D and/or lower guide pins 244A and 244B having particular geometric shapes are illustrated in FIG. 3B, any number of upper guide pins 242A, 242B, 242C and 242D and/or lower guide pins 244A and 244B having any shape suitable for attaching and/or aligning lens carrier with or to the desired structure may be used. Representatively, although only two lower guide pins 244A and 244B are illustrated along a front side of lens carrier 212, it is contemplated that additional lower guide pins (e.g., 2 more lower guide pins substantially similar to lower guide pins 244A and 244B) may be positioned along the back side of lens carrier 212 in a similar manner. Alternatively, a single lower guide pin may extend from one or more sides of lens carrier 212.

Lens carrier 212 having AF coils 214A, 214B, 214C and 214D attached thereto, is attached to and sits on top of AF lower flexure 224. AF lower flexure 224 will now be described in more detail in reference to FIG. 3D. AF lower flexure 224 may have various spring and flexure structures incorporated therein that facilitate movement of lens carrier 212, and the associated lens, according to the desired degrees of freedom previously discussed in reference to FIG. 1. The AF lower flexure 224 can be attached (e.g., bonded) on the bottom side of the lens carrier 212 according to any suitable attachment mechanism or system. For example, in one embodiment, AF lower flexure 224 is attached to the bottom of lens carrier 212 by aligning pins (not shown) extending from the bottom side of lens carrier 212 with holes 253A and 253B formed within free ends 252A, 252B, 252C and 252D of AF lower flexure 224.

AF lower flexure 224 carries several functions, including functions in the AF mechanism 202 and OIS mechanism 204. In one embodiment, AF lower flexure 224 may include several lower flexure assemblies 224A, 224B, 224C and 224D (e.g., four flexure assemblies when installed into the actuator module 100), such that there is one lower flexure assembly 224A, 224B, 224C and 224D positioned in each corner of the actuator module 100. AF lower flexure 224 may be manufactured as a single component from a sheet material (e.g., a sheet of metal material), where the sprue (not shown) is removed during the course of manufacture. Each of the four flexure assemblies may have a portion mounted to the lens carrier 212, and a portion mounted to the AF mechanism fixed portion. Representatively, free ends 252A, 252B, 252C and 252D may be mounted to lens carrier 212 and fixed mount portions 256A, 256B, 256C and 256D may be mounted to the AF mechanism fixed portion. In some embodiments, to facilitate mounting, each of the free ends 252A, 252B, 252C and 252D and fixed mount portions 256A, 256B, 256C and 256D may include holes dimensioned to receive pins or posts extending from the structures to which they are to be mounted to.

Between these two mounting regions, each of the lower flexure assemblies 224A, 224B, 224C and 224D may include AF lower springs 248A, 248B, 248C and 248D, respectively. One or more of the AF lower springs 248A, 248B, 248C and 248D may be a spring beam which suspends the lens carrier 212 on the fixed part of the AF mechanism 202. AF lower springs 248A, 248B, 248C and 248D may help to minimize tilt and other parasitic motions of the associated lens as well as a spring force resisting the VCM force. In this aspect, each of AF lower springs 248A, 248B, 248C and 248D may have any shape and dimensions suitable to provide actuator module 100 with a desired level of stiffness in the optical axis direction (e.g., axis 106), high stiffness to motions orthogonal to the optical axis (e.g., axes 108 and 110), and yet be capable of withstanding deformations in directions orthogonal to the optical axis, such as during lens insertion and drop-testing.

Figure 3D:
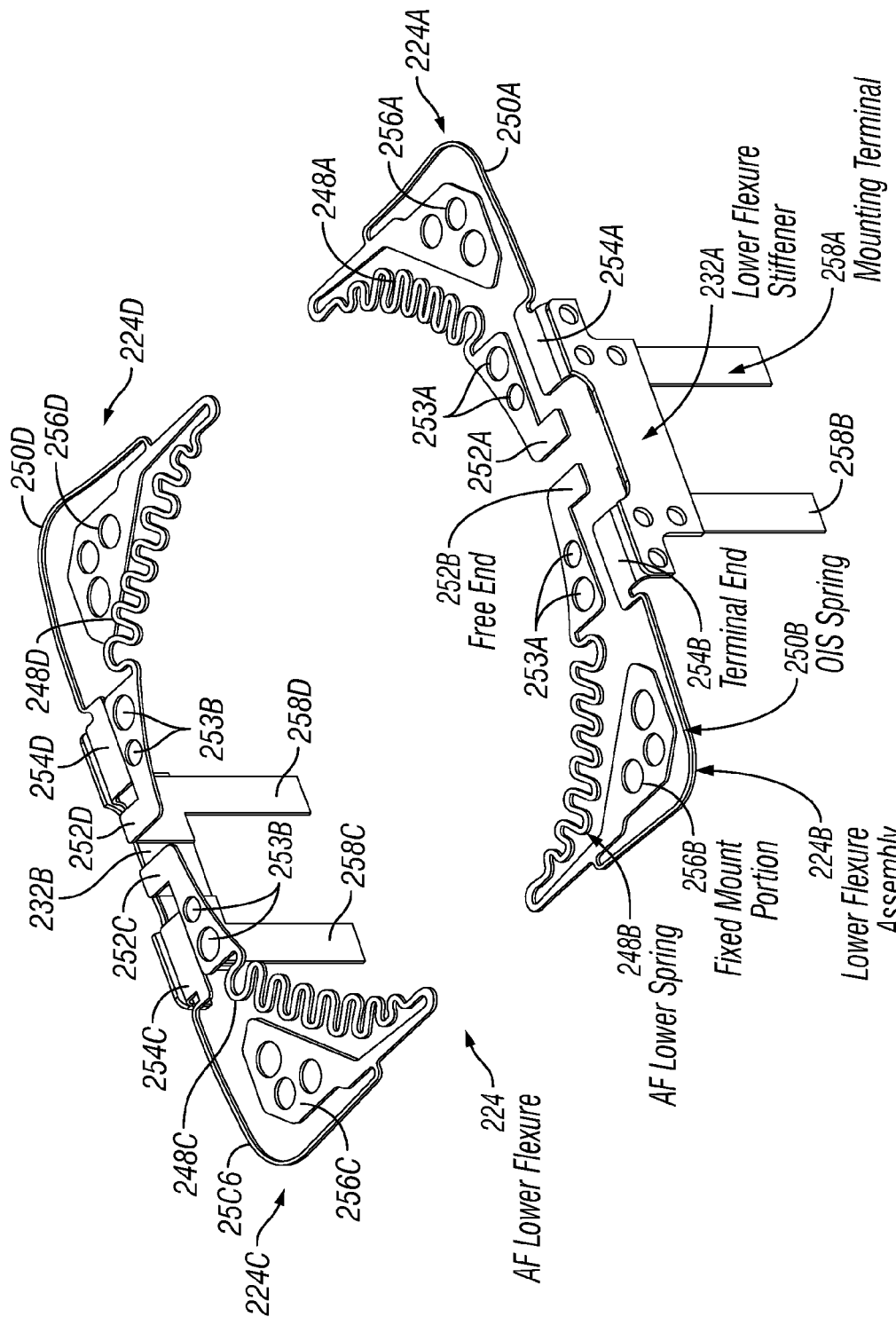
FIG. 3D is a perspective view of one embodiment of a lower flexure assembly for an autofocus mechanism moving portion.

Each of the lower flexure assemblies 224A, 224B, 224C and 224D may further include terminal ends 254A, 254B, 254C and 254D which extend from OIS springs 250A, 250B, 250C and 250D and attach to the OIS base 230. Each of OIS springs 250A, 250B, 250C and 250D are positioned between their respective terminal ends 254A, 254B, 254C and 254D and the region mounted to the AF mechanism fixed portion (i.e., fixed mount portions 256A, 256B, 256C and 256D). OIS springs 250A, 250B, 250C and 250D are dimensioned to form part of a linking region that links the AF mechanism fixed portion to a fixed portion of the OIS mechanism. OIS springs 250A, 250B, 250C and 250D are further dimensioned to accommodate the relative motions of OIS mechanism 204 in planes orthogonal to the optical axis of an associated lens. In other words, OIS springs 250A, 250B, 250C and 250D are capable of accommodating motions in two orthogonal directions (e.g., in directions parallel to first lateral axis 108 and second lateral axis 110), and providing the appropriate return forces for such motions so as to resist the VCM forces. In some embodiments, in order to accommodate the motion in the two orthogonal directions, OIS springs 250A, 250B, 250C and 250D may be bent into a substantially "L" shaped structure as illustrated in FIG. 3D.

The functions of the AF lower springs 248A, 248B, 248C and 248D and the OIS springs 250A, 250B, 250C and 250D may therefore, in some embodiments, be combined into a single component. Such combination is advantageous, both for packaging reasons, and further because it provides a conduit to route electrical connections from the AF mechanism 202 to the bottom of the actuator module 100, and ultimately the associated image sensor substrate. In particular, given that the AF lower flexure 224 is split into four regions, it can accommodate four electrical connections all the way to the lens carrier 212, onto which the AF coils 214A, 214B, 214C and 214D are mounted. In this aspect, only four electrical connections can easily be made to the AF mechanism 202, and there are four AF coils 214A, 214B, 214C and 214D, each with two terminals that can be used to control at least three degrees-of-freedom.

In addition, in the illustrated embodiment, OIS springs 250A, 250B, 250C and 250D are substantially symmetrical, thereby nominally eliminating parasitic twisting forces. The four AF coils 214A, 214B, 214C and 214D and their associated magnets may also be symmetric around the lens carrier 212 so as not to introduce parasitic tilting torques. They can, however, be controlled so as to actively tilt the associated lens as desired. Still further, functions are combined in several of the components to eliminate complexity. For example, the AF lower flexure 224 forms both the AF lower springs 248A, 248B, 248C, 248D and OIS springs 250A, 250B, 250C, 250D.

Note that the AF lower flexure 224 may, in some embodiments, already have mounted on its terminal ends 254A, 254B, 254C and 254D one or more lower flexure stiffeners 232A and 232B that help to attach the flexure assemblies together thereby stabilizing AF lower flexure 224. Materials and/or coatings for lower flexure stiffeners 232A and 232B are chosen to maintain electrical isolation between the two terminals (e.g., terminal ends 254A and 254B or terminal ends 254C and 254D) to which they are connected. In addition, one or more of mounting terminals 258A, 258B, 258C and 258D may extend from lower flexure stiffeners 232A and 232B to facilitate mounting of AF lower flexure 224 over OIS base 230.

Once the AF mechanism moving portion 302 is assembled as illustrated in FIG. 3A, the terminals of AF coils 214A, 214B, 214C and 214D are soldered to pads on the AF lower flexure 224 to complete the AF mechanism moving portion 302. For example, each of AF coils 214A, 214B, 214C and 214D is wrapped onto the respective posts 244A, 244B (there are also two posts on the other side of lens carrier 212 which cannot be seen from this view), which locates them mechanically. They are then soldered onto the lower flexure free ends 252A-252D, respectively. The other end of each coil is run into the respective channels 246A-246D to locate them (as described earlier), before all being soldered to the AF upper flexure 420. In one embodiment, indentations 270A, 270B may be made within corresponding portions of AF upper flexure 420 (see FIG. 2), where the wires in the channels are brought up onto the top surface of the AF upper flexure 420 for soldering.

Features of the AF mechanism fixed portion will now be described in reference to FIGS. 4A-4F. FIG. 4A illustrates a top perspective view of AF mechanism fixed portion 402 attached to AF mechanism moving portion 302. AF mechanism fixed portion 402 may include AF yoke 222, which is mounted over AF mechanism moving portion 302. An AF upper flexure 420 may be attached to a top surface of AF yoke 222. As can be seen from FIG. 4B, AF yoke 222 is a substantially rectangular frame type structure which includes corner support members 403A, 403B, 403C and 403D over each corner. Since AF upper flexure 420 also has a rectangular profile, it can be supported along its corner by each of corner support members 403A, 403B, 403C and 403D such that it is suspended over AF upper flexure 420.

AF upper flexure 420 may include AF upper springs 422A, 422B, 422C and 422D which extend across each corner and suspend associated carrier support members 424A and 424B at their ends. Representatively, each of AF upper springs 422A, 422B, 422C and 422D may be attached at one end to a wall of AF upper flexure 420 and at an opposite end to one end of the associate carrier support member 424A or 424B. Carrier support members 424A and 424B are in turn attached to lens carrier 212 by, for example, inserting upper guide pins 242A, 242B, 242C and 242D extending from the top surface of lens carrier 212 through corresponding holes formed within support members 424A and 424B. Terminals of AF coils 214A, 214B, 214C and 214D can be soldered to AF upper flexure 420 to make electrical connection between all of the AF upper springs 422A, 422B, 422C and 422D. AF upper flexure 420 can be electrically isolated from the AF yoke 222 by, for example, conformally coating the AF yoke 222.

AF upper springs 422A-422D along with AF lower springs 248A-248D suspend lens carrier 212 on the AF mechanism fixed portion 402. The combination of the AF upper springs 422A-422D and AF lower springs 248A-248D together provides a relatively low stiffness along the optical axis, and a relatively high stiffness in directions orthogonal to the optical axis. Since AF upper springs 422A-422D and AF lower springs 248A-248D are disposed relative to each other along the optical axis, a stiffness is provided which prevents undesired tilting (e.g., rotation of the associated lens about axes orthogonal to the optical axis).

Figure 4B:
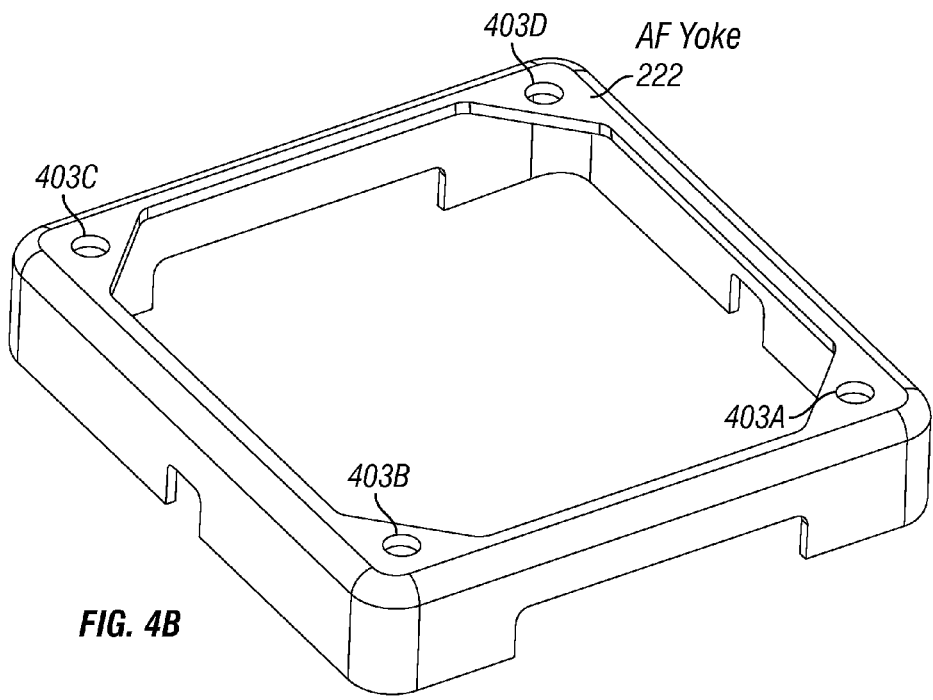
FIG. 4B is a perspective view of one embodiment of a yoke assembly for an autofocus mechanism fixed portion.
Figure 4C:
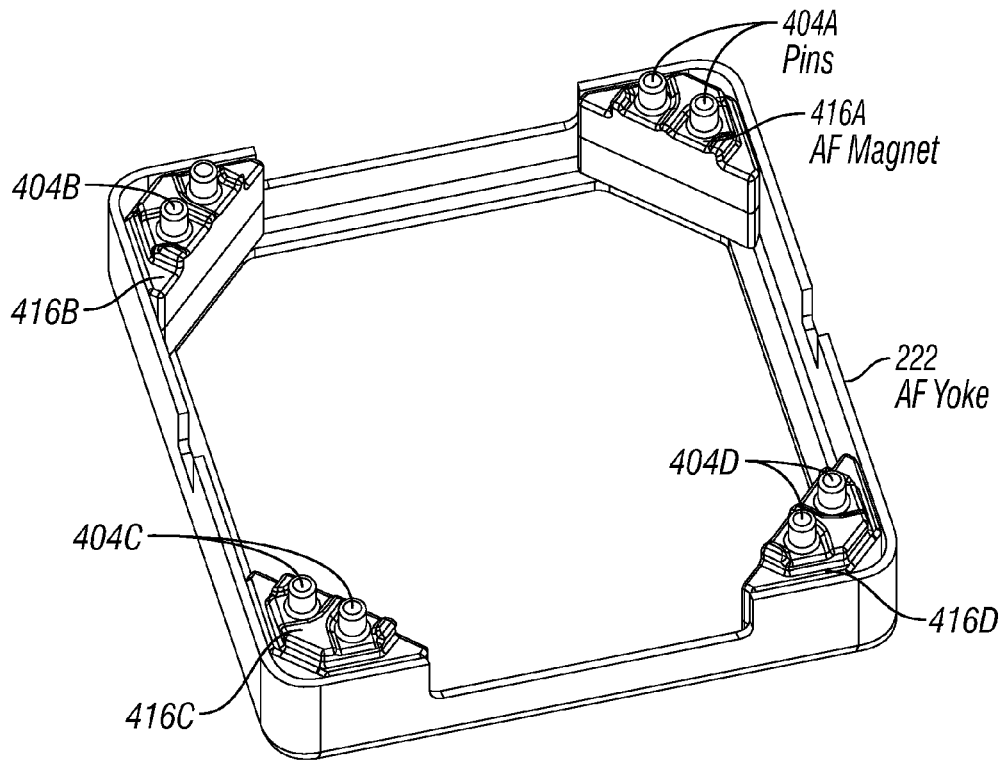
FIG. 4C is a perspective view of one embodiment of a yoke and magnet assembly for an autofocus mechanism fixed portion.

As can be seen from the bottom perspective view of yoke 222 illustrated in FIG. 4C, AF magnets 416A, 416B, 416C and 416D are mounted and bonded into the AF yoke 222. In this aspect, AF yoke 222 is a substantially square frame like structure having side walls that form corners as illustrated in FIG. 4B. AF magnets 416A, 416B, 416C and 416D may be mounted into each of the corners as illustrated in FIG. 4C. AF magnets 416A, 416B, 416C and 416D may, in one embodiment, be substantially triangular structures which are dimensioned to fit within the corners of AF yoke 222.

Figure 4D:
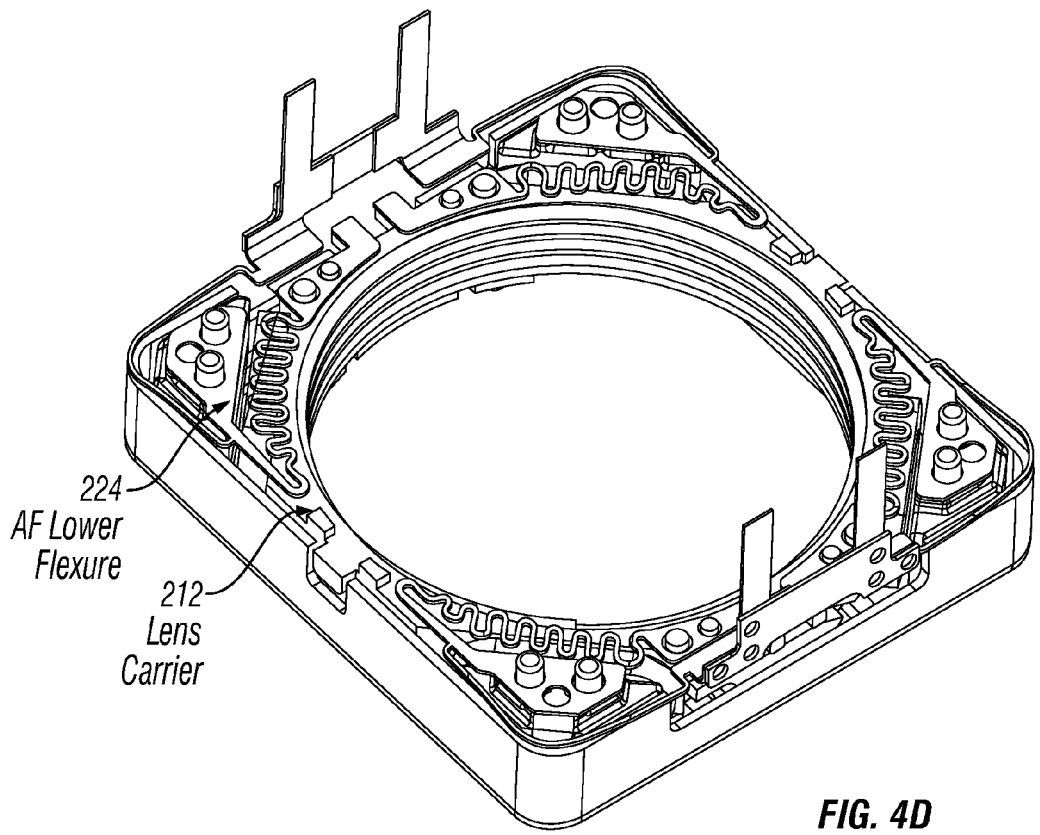
FIG. 4D is a perspective view of one embodiment of an autofocus mechanism moving portion attached to an autofocus mechanism fixed portion.
Figure 4E:
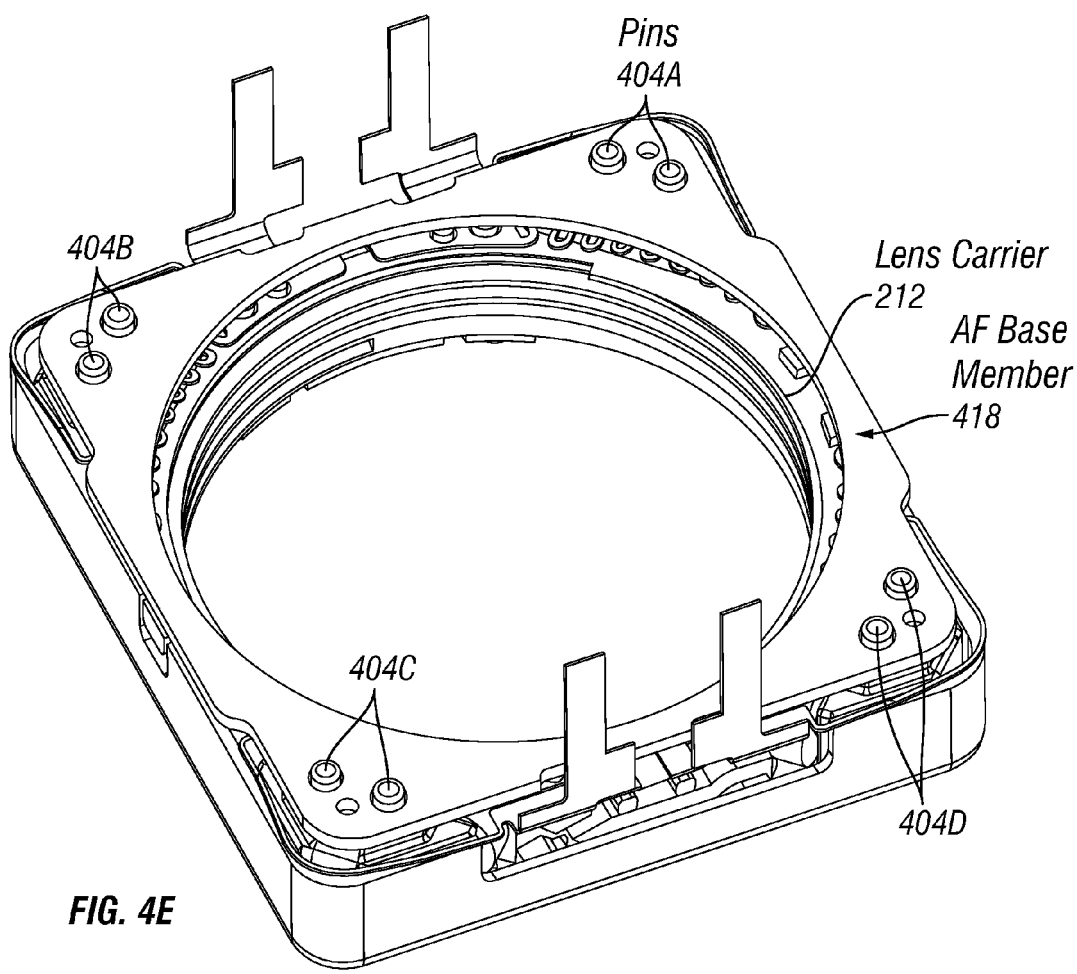
FIG. 4E is a perspective view of one embodiment of an autofocus mechanism moving portion attached to an autofocus mechanism fixed portion.

The AF mechanism moving portion 302 is then mounted to the AF mechanism fixed portion 402 by aligning holes formed through fixed mount portions 256A, 256B, 256C and 256D of AF lower flexure 224 with the pins 404A, 404B, 404C and 404D extending from the bottom of each of AF magnets 416A, 416B, 416C and 416D (e.g., two on each AF magnet). Once the holes are aligned with the pins, AF lower flexure 224 can be inserted onto the bottom of AF mechanism fixed portion 402, which in turn positions lens carrier 212 within the central opening of AF yoke 222 as illustrated by FIG. 4D. Pins 404A, 404B, 404C and 404D may also be used to position AF base member 418 over AF lower flexure 224 as illustrated by FIG. 4E. It is noted that although pins 404A, 404B, 404C and 404D are illustrated, it is contemplated that any type of mechanism suitable for aligning and attaching AF mechanism fixed portion 402 with AF mechanism moving portion 302 (e.g., bolts, clamps, welding or the like) may be used.

AF base member 418 may serve several different purposes. Representatively, AF base member 418 may form part of the support structure joining the AF mechanism 202 to the OIS mechanism 204. AF base member 418 may also serve as a mechanical end-stop for the lens carrier 212 during drop-testing. Still further, AF base member 418 may form a magnetic yoke, which largely separates the magnetic fields from the AF mechanism 202 and the OIS mechanism 204. In this aspect, AF base member 418 may be a substantially planar frame-like structure positioned between AF lower flexure 224 and the OIS magnets. AF base member 418 may be made of any material suitable for performing the above-described functions. For example, AF base member 418 may be made of a metal material such as a magnetic stainless steel material or the like.

Figure 4F:
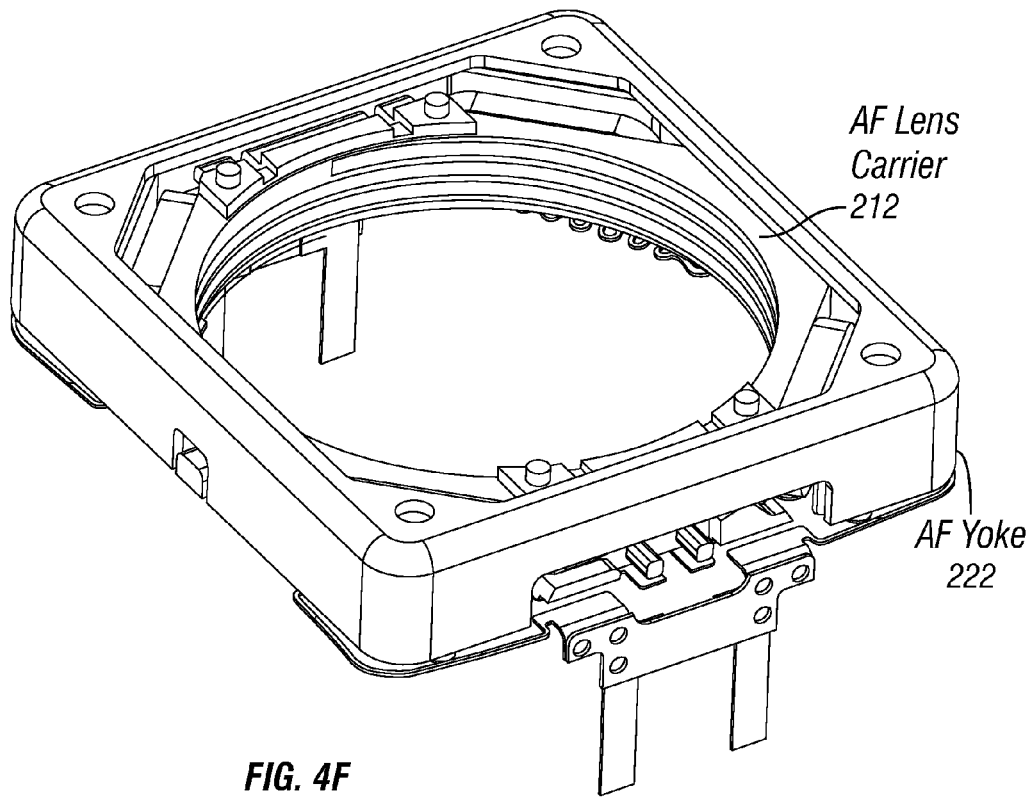
FIG. 4F is a perspective view of one embodiment of an autofocus mechanism moving portion attached to an autofocus mechanism fixed portion.

FIG. 4F illustrates a top perspective view of AF yoke 222 positioned over AF mechanism moving portion 302 with AF upper flexure 420 removed. As can be seen from this view, AF mechanism moving portion 302 sits within and is surrounded by AF yoke 222. AF upper flexure 420 can be attached (e.g., bonded) to lens carrier 212 and AF yoke 222 as illustrated in FIG. 4A to form the complete AF mechanism 202.

Figure 5A:
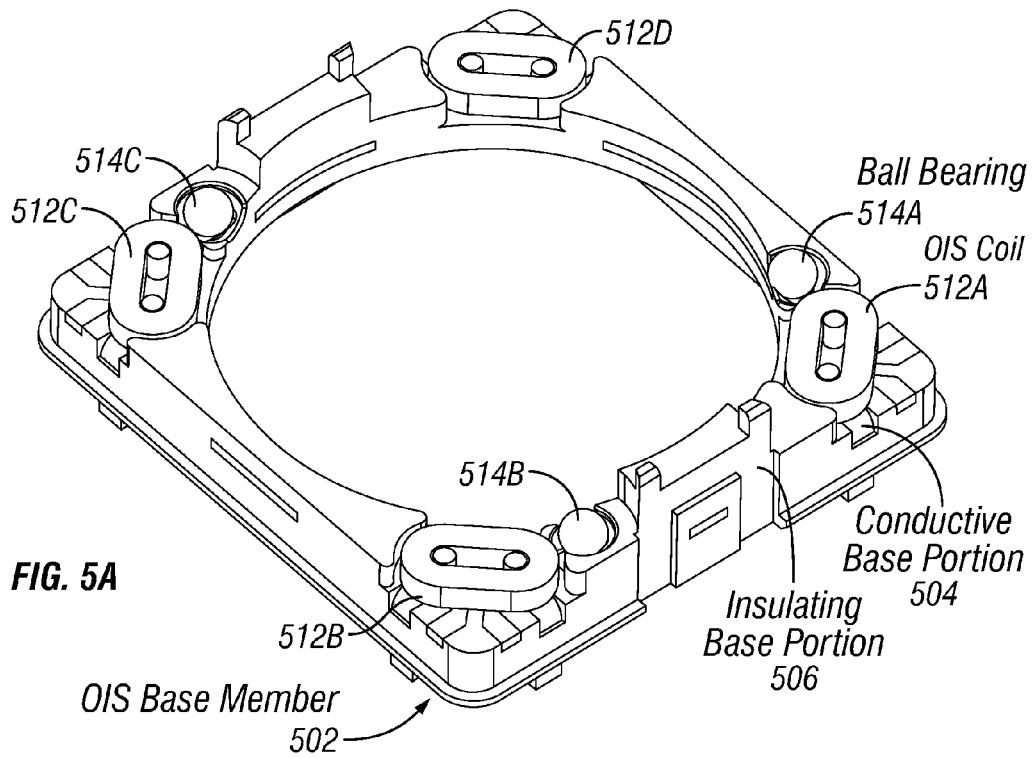
FIG. 5A is a perspective view of one embodiment of an optical image stabilization mechanism fixed portion.
Figure 5B:
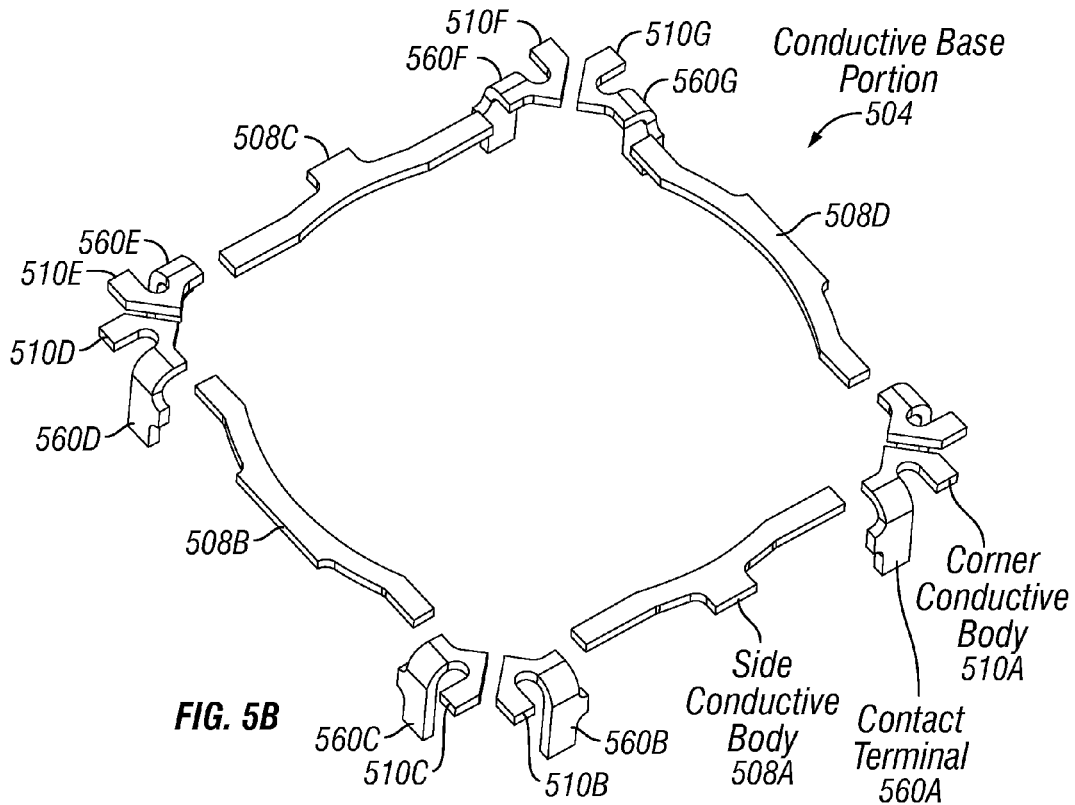
FIG. 5B is a perspective view of one embodiment of a conductive base portion for an optical image stabilization mechanism fixed portion.

Various aspects of the OIS mechanism 204 will now be described in reference to FIGS. 5A-5G. FIGS. 5A and 5B show OIS mechanism 204 having OIS base member 502 which, during operation, is positioned below each OIS magnet 226A, 226B and 226C, as illustrated in FIG. 2. OIS base member 502 may be considered the OIS mechanism fixed portion in that it remains substantially stationary during actuator operation. OIS base member 502 may include a conductive base portion 504, an insulating base portion 506, OIS coils 512A, 512B, 512C and 512D and one or more of ball bearings 514A, 514B, and 514C. OIS base member 502 may be a substantially rectangular structure dimensioned to receive OIS coils 512A, 512B, 512C and 512D at each of its corners. OIS base member 502 may form the bottom of the complete actuator module. The underside surface of OIS base member 502 may form the mounting bond surface for the associated image sensor 101 when the actuator module 100 is integrated into a complete camera.

In one embodiment, the OIS base member 502 is an over-molding, having a conductive base portion 504, which is placed in an injection molding machine, and around which an insulating base portion 506 can be molded. OIS base member 502 may have any size and shape suitable for mounting within actuator module 100, for example, a substantially square shape with an open center portion. In one embodiment, conductive base portion 504 can be split into twelve conductive bodies as illustrated in FIG. 5B. Representatively, conductive base portion 504 may include four side conductive bodies 508A, 508B, 508C and 508D and eight corner conductive bodies 510A, 510B, 510C, 510D, 510E, 510F, 510G and 510H. Side conductive bodies 508A, 508B, 508C and 508D may be positioned along the sidewalls of insulating base portion 506 and corner conductive bodies 510A, 510B, 510C, 510D, 510E, 510F, 510G and 510H may be positioned at the corners of insulating base portion 506. Although side conductive bodies 508A, 508B, 508C and 508D and corner conductive bodies 510A, 510B, 510C, 510D, 510E, 510F, 510G and 510H are separate structures, they may be manufactured as a single component held together in a sprue on a sheet (not shown). Once the insulating base portion 506, which can be made of, for example, a plastic material, is over-molded around the conductive base portion 504, the sprue is removed, splitting the conductive base portion 504 into the twelve separated conductive bodies 508A, 508B, 508C and 508D, 510A, 510B, 510C, 510D, 510E, 510F, 510G, 510H. Although twelve conductive bodies are illustrated, it is contemplated that more or less of the conductive bodies may be provided within OIS base member 502. For example, the only side conductive bodies or only corner conductive bodies may be present in OIS base member 502. Conductive bodies 508A, 508B, 508C, 508D and 510A, 510B, 510C, 510D, 510E, 510F, 510G, 510H may have any sizes and shapes suitable for positioning within the desired region of OIS base member 502, but in general are relatively thin elongated structures. In addition, although in one embodiment, the above-described over-molding technique is used to form OIS base member 502, it is contemplated that other techniques suitable for forming an OIS base member having a conductive portion and an insulating portion may be used. For example, the conductive portion and the insulating portion may be separately formed and attached to one another after they are formed, for example, by soldering one to the other.

Figure 5C:
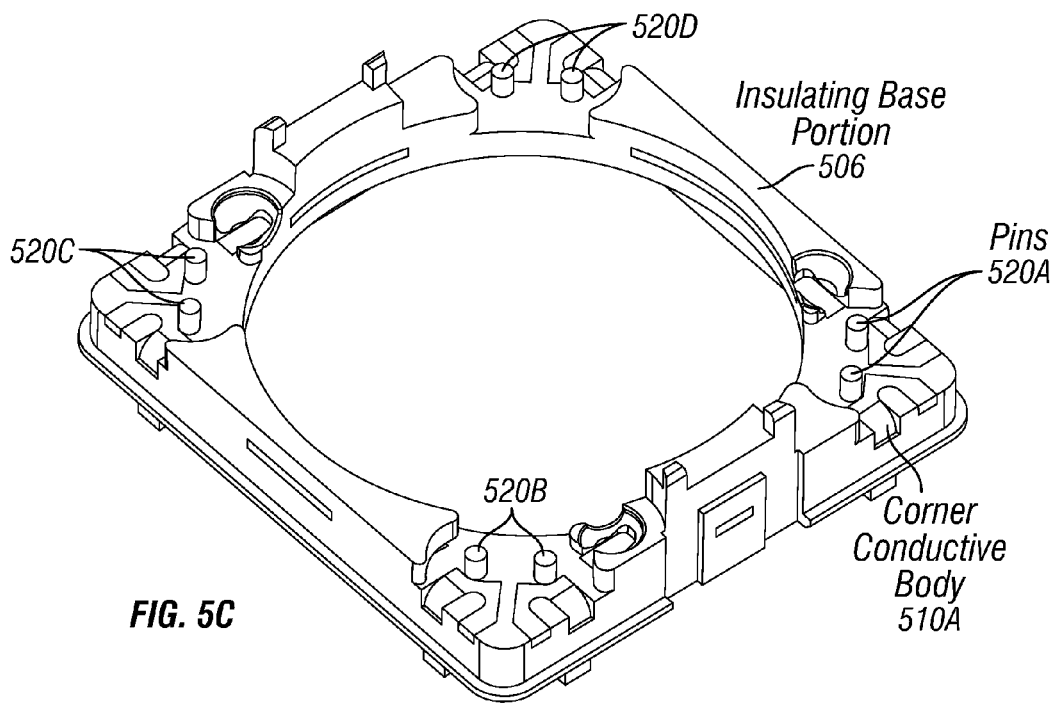
FIG. 5C is a perspective view of one embodiment of a conductive base portion and an insulating base portion for an optical image stabilization mechanism fixed portion.
Figure 5D:
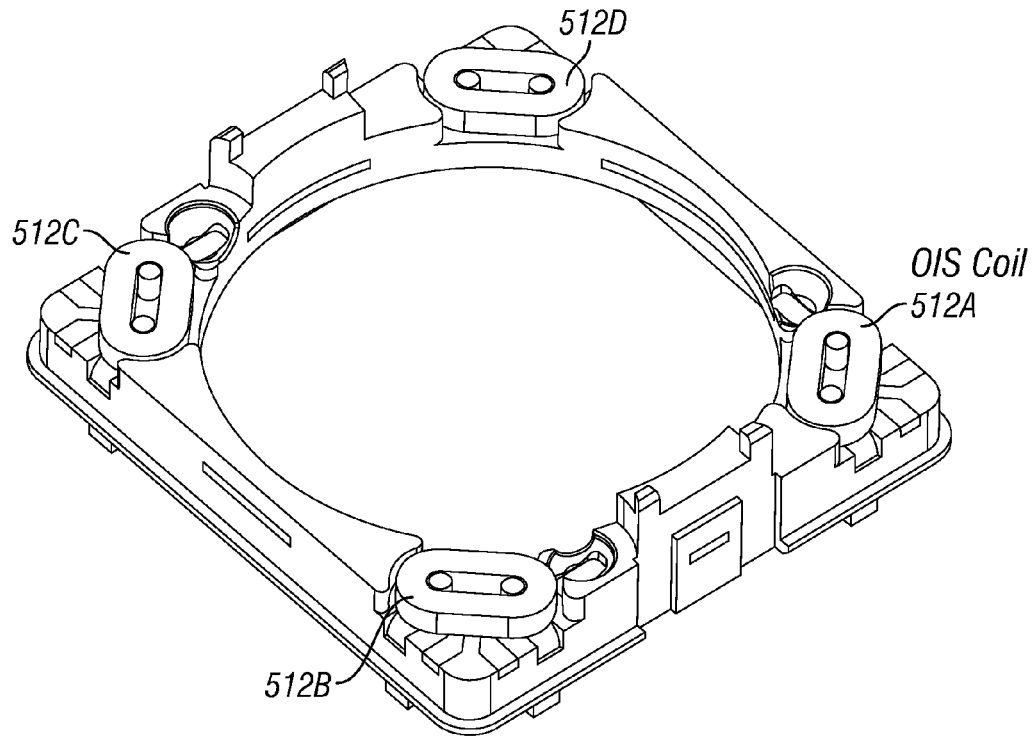
FIG. 5D is a perspective view of one embodiment of a coil assembly mounted to an optical image stabilization mechanism fixed portion.

FIGS. 5C and 5D show the other components mounted on the insulating base portion 506. Representatively, as can be seen from FIG. 5C, each of the corners of insulating base portion 506 include recessed regions having a pair of pins 520A, 520B, 520C and 520D extending therefrom. It is noted that although pairs of pins are illustrated in each corner, a single pin or more than two pins may be present in each corner, for example three pins. These recessed regions with pins 520A, 520B, 520C and 520D therein are dimensioned to align and support OIS coils 512A, 512B, 512C and 512D as illustrated in FIG. 5D. In one embodiment, each of OIS coils 512A, 512B, 512C and 512D may be substantially the same and may be positioned in a substantially horizontal orientation such that their openings are positioned around pins 520A, 520B, 520C and 520D as illustrated. It is to be understood, however, that although pin type structures are illustrated, any type of alignment structure could be used to position OIS coils along OIS base member 502 according to the desired orientation (e.g., elongated structures similar to guide members 240A, 240B, 240C and 240D).

Figure 5E:
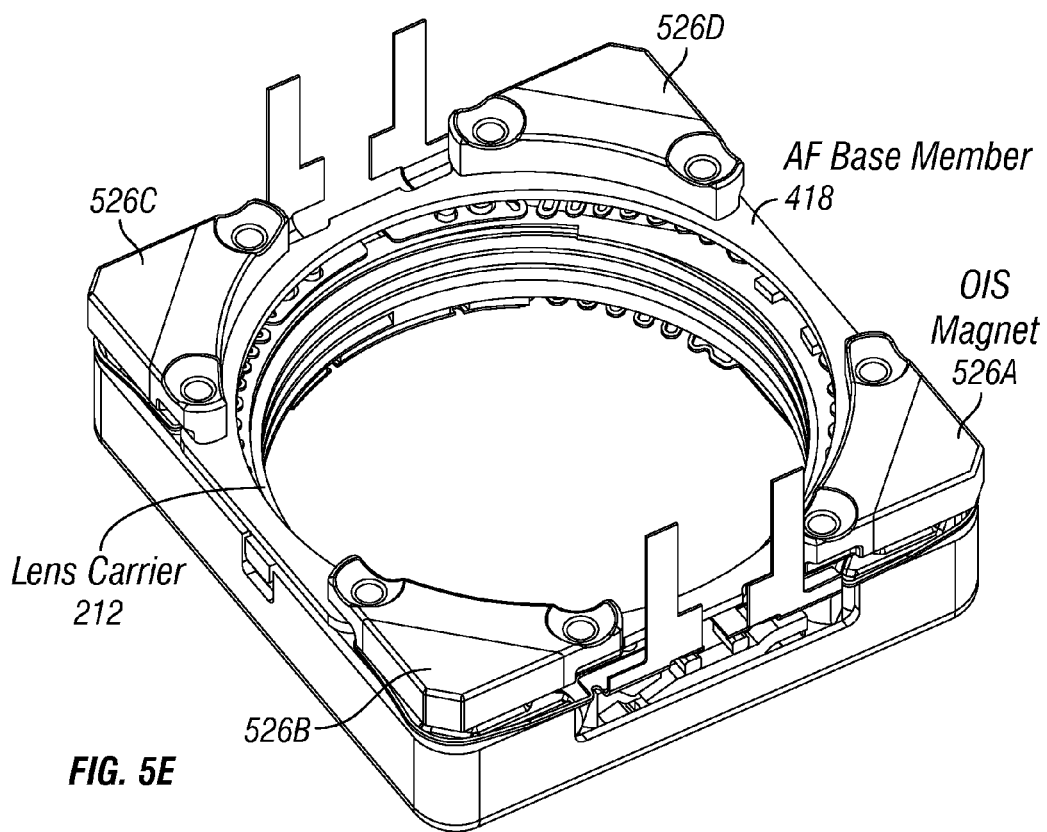
FIG. 5E is a perspective view of one embodiment of an optical image stabilization mechanism moving portion.

Since, in one embodiment, each of OIS coils 512A, 512B, 512C and 512D are mounted on the fixed portion of the OIS mechanism 204 (e.g., OIS base member 502), OIS magnets 526A, 526B, 526C and 526D can in turn be mounted to a movable portion of actuator module 100 such that they are movable with respect to OIS base member 502. Representatively, OIS magnets 526A, 526B, 526C and 526D may be mounted to a bottom surface of AF base member 418, which forms the bottom of AF mechanism 202, as illustrated by FIG. 5E. Such configuration may be desirable where, as in the instant embodiment, each of OIS coils 512A, 512B, 512C and 512D require two electrical connections therefore 8 connections total must be routed through the associated mounting portion. It is contemplated, however, that in other embodiments, each of OIS coils 512A, 512B, 512C and 512D may be mounted to the moving portion and the magnets mounted to the fixed portion.

Figure 5F:
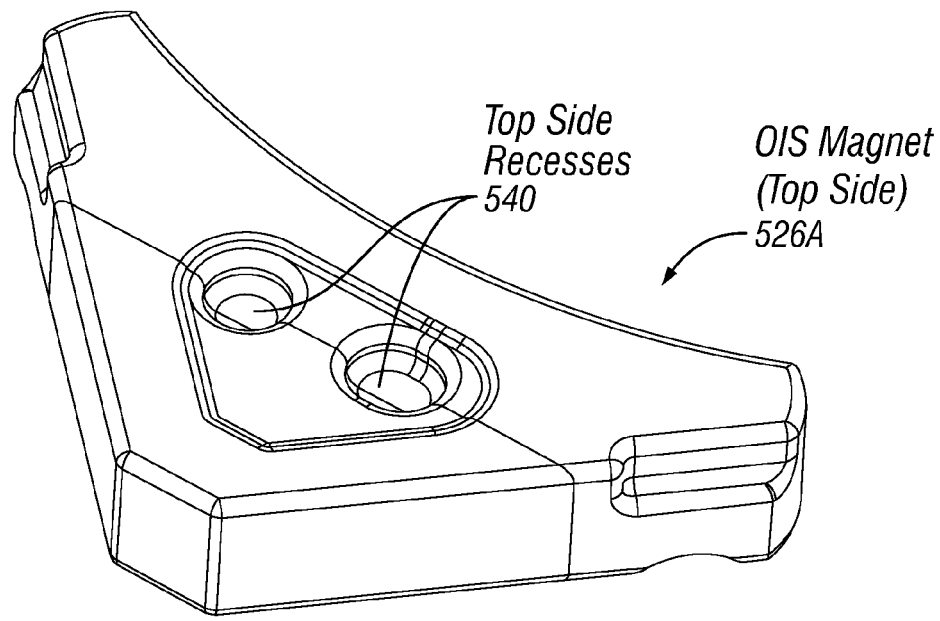
FIG. 5F is a perspective view of one embodiment of a magnet assembly for an optical image stabilization mechanism moving portion.
Figure 5G:
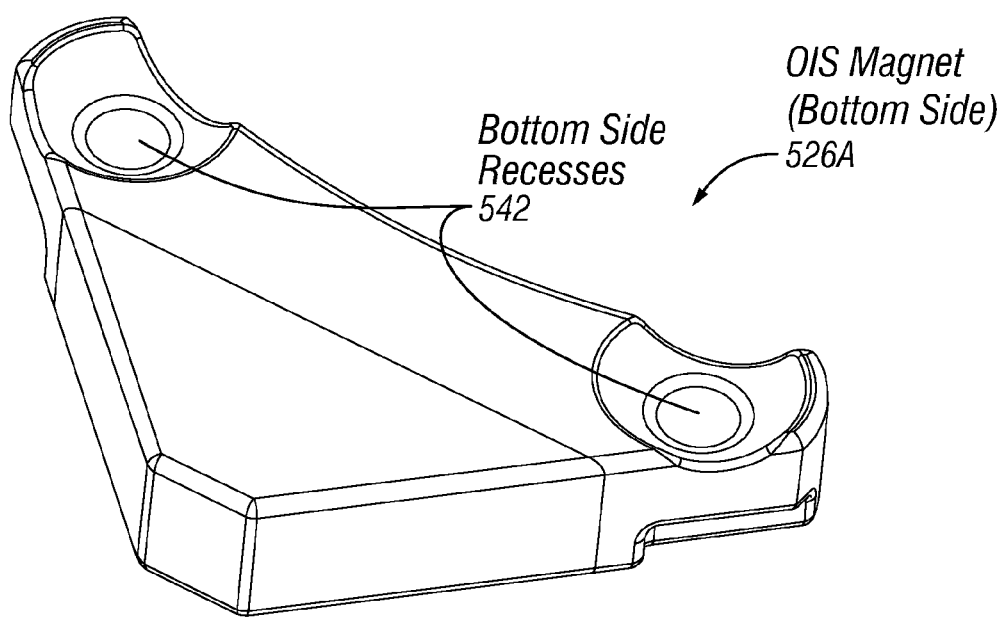
FIG. 5G is a perspective view of one embodiment of a magnet assembly for an optical image stabilization mechanism moving portion.

OIS magnets 526A, 526B, 526C and 526D may be dimensioned to overlap the corners of OIS base member 502 such that they are aligned over each of OIS coils 512A, 512B, 512C and 512D. To facilitate alignment of OIS magnets 526A, 526B, 526C and 526D between AF base member 418 of AF mechanism 202 and OIS base member 502, recesses may be formed in one or more of the top or bottom side of the magnets. Since the OIS magnets 526A, 526B, 526C and 526D may be sintered from metal, adding recesses to these components may save space and reduce complexity. The recesses may be dimensioned to align with and receive pins or posts extending from base member 418 of AF mechanism 202 and OIS base member 502. Representatively, in one embodiment, the top side of one or more of OIS magnets 526A, 526B, 526C and 526D, for example OIS magnet 526A, may include a pair of top side recesses 540 as illustrated in FIG. 5F, which are dimensioned to align with and receive, for example, the pair of pins 404A which extend from AF magnet 416A and extend through AF base member 418 as described in reference to FIG. 4E. A pair of bottom side recesses 542 may further be formed within a bottom side of one or more of OIS magnets 526A, 526B, 526C and 526D, for example OIS magnet 526A as illustrated in FIG. 5G. Bottom side recesses 542 may be dimensioned to align with and receive ball bearings 514A, 514B and 514C, which are positioned along the top surface of OIS base member 502. Ball bearings 514A, 514B and 514C may be placed in recesses in the OIS insulating base portion 506. In one embodiment, there are three ball bearings 514A, 514B and 514C placed in three recesses formed near corners of insulating base portion 506. It is contemplated, however, that more or less than three ball bearings may be used. Ball bearings 514A, 514B and 514C guide the motion of the moving portion of the OIS mechanism 202 so that substantially all motion of the OIS mechanism 202 relative to the image sensor is in a plane orthogonal to the optical axis.

It is to be understood that for proper operation of OIS mechanism 204, contact must be maintained between the ball bearings 514A, 514B and 514C and the OIS conductive base portion 504 (which is the fixed portion of the OIS mechanism), and ball bearings 514A, 514B and 514C and the moving portion of the OIS mechanism (i.e., portion with OIS magnets 526A-526D). In one embodiment, to maintain such contact, an attractive force is applied between the OIS mechanism moving portion (i.e., portion with OIS magnets 526A-526D) and the fixed portion (i.e., OIS base member 502). The attractive force can be supplied by the magnetic attraction between the conductive bodies 508A, 508B, 508C, 508D and 510A, 510B, 510C, 510D, 510E, 510F, 510G, 510H, which may be made of a magnetic material such as a metal, in the conductive base portion 504 and the OIS magnets 526A-526D.

In addition, surfaces on the conductive bodies 508A, 508B, 508C, 508D and 510A, 510B, 510C, 510D, 510E, 510F, 510G, 510H in the OIS base member 502 form the contact surfaces with ball bearings 514A, 514B and 514C. In this way the rolling friction is minimized, and the contact surfaces will remain flat during drop test impact when high loads are potentially applied through these contact surfaces that may indent a plastic surface.

In one embodiment, eight of corner conductive bodies 510A, 510B, 510C, 510D, 510E, 510F, 510G, 510H in the OIS base member 502 form contact terminals for OIS coils 512A, 512B, 512C and 512D. Representatively, corner conductive bodies 510A, 510B, 510C, 510D, 510E, 510F, 510G, 510H may form contact terminals 560A, 560B, 560C, 560D, 560E, 560F and 560G, which route electrical connections to the underside of the OIS base member 502, where they can be subsequently soldered to pads on the image sensor substrate. The ends of the OIS coils 512A, 512B, 512C and 512D can be soldered to these terminal pads. In this aspect, OIS conductive base portion 504 serves several functions. Representatively, conductive base portion 504 provides bearing surfaces for ball bearings 514A, 514B and 514C, a magnetic attraction functionality for OIS magnets 526A, 526B, 526C and 526D and contact terminals for the OIS coils 512A, 512B, 512C and 512D.

In one embodiment, OIS base member 502 may be assembled by positioning OIS coils 512A, 512B, 512C and 512D over base pins 520A, 520B, 520C and 520D and bonding the OIS coils 512A, 512B, 512C and 512D to OIS base member 502. The ends of OIS coils 512A, 512B, 512C and 512D may be soldered to terminal pads on the OIS base member 502. Ball bearings 514A, 514B and 514C are then placed in recesses formed within insulating base portion 506.

In one embodiment, the OIS mechanism moving portion, which is illustrated in FIGS. 5E-5G, and consists of the OIS magnets 526A, 526B, 526C and 526D, may be formed by bonding the OIS magnets to the underside of the AF base member 418 using the pins in the corners to locate the OIS magnets 526A, 526B, 526C and 526D.

Once assembled, the AF mechanism 202 with OIS magnets 526A, 526B, 526C and 526D attached thereto can then be mounted on the OIS mechanism fixed portion, in other words OIS base member 502, as illustrated in FIG. 2. Terminals of the AF lower flexure 224 can be bonded to the OIS base member 502.

Actuator assembly is then completed by positioning housing 104 over the combined AF and OIS mechanism assembly and bonding housing 104 to OIS base member 502. The resulting actuator module 100 provided includes several important features that improve actuator performance. Namely, since there are OIS and AF coils and magnets in each corner, uncontrolled asymmetric actuator forces are kept to a minimum. This in turn means that there is little need to account for large twisting forces (torques around the optical axis) from the OIS mechanism. In addition, the OIS springs 250A-250D on lower flexure 224 are symmetric, thereby nominally eliminating parasitic twisting forces. The four AF coils 214A-214D and the AF magnets 416A-416D are also symmetric around the lens carrier 212 so as not to introduce parasitic tilting torques. They can, however, be controlled so as to actively tilt the lens as desired. Still further, functions are combined in several of the components to eliminate complexity. In particular, OIS magnets 526A-526D have features (e.g., recesses 542) to locate ball bearings 514A-514C. The AF lower flexure 224 forms both the AF lower springs 248A-248B and OIS springs 250A-250D. In addition, the OIS base member 502 includes a metal component (i.e., conductive base portion 804) that serves several functions. Namely, conductive base portion 504 can act as the OIS yoke to hold the mechanism together through magnetic attraction; act as one half of the contact surfaces for the ball bearings 514A-514C; and act as the terminals for the OIS coils 512A-512D.

With the actuator architecture described herein, actuator module 100 can be used to drive a relatively large lens within a camera having a relatively small overall camera footprint. For example, actuator module 100 is suitable for use with a lens having a 6.2 mm diameter thread at the top, a 6.5 mm diameter at the bottom and a camera having an overall camera footprint of less than 8.5 mm square.

It is further noted that actuator module 100 makes it possible to apply offset currents to the OIS coils to generate shifting forces on lens 102 (see FIG. 1) to both compensate for lateral alignment errors between lens 102 and the image sensor due to manufacturing variations, and lens sag. Lens sag may occur when the camera is in different orientations, as determined by the accelerometer in the mobile electronic device.

For example, in one embodiment, to correct for the 'lens sag' and/or 'lens tilt' associated with different camera orientations, the sag and tilt may be assessed for each of the three possible orthogonal orientations of the optical axis, each in either direction (i.e., six total), one of which includes the camera oriented vertically upwards. In one embodiment, relative sag and tilt values for each of the three orthogonal orientations, using the negative values for the opposite directions, may be stored within, for example a controller (e.g., a microprocessor) of the hand-held device. Then for a given camera orientation, as assessed by the direction of gravity by the accelerometer, the actual sag and tilt would be assumed to be a linear combination of the three stored values of sag and tilt (or their opposites) for the different direction components.

A tilting resonant structure within the gyroscope found within the electronic mobile device can then be used to assess the applied angular velocity of the device, as occurs during handshake. The gyroscope can output either an analogue voltage signal for each axis measured, or a digital signal. In either case, a controller such as a microprocessor within the hand-held device receives, stores and then computes the integration of the gyroscope data stream over time, so as to calculate the angle of the hand-held device. The gyroscope is a dynamic device for measuring angular velocity and therefore has a lower limit to the frequency bandwidth over which it can accurately assess angular velocity. As a result, the gyroscope cannot distinguish different static angles, and its accuracy degrades at progressively lower frequencies. For this reason, the integrated gyroscope data is then filtered using a 'high pass filter' to substantially remove the inaccurate low frequency data. Depending on the design of filter, it may progressively remove angular information below 1 Hz or 0.1 Hz.

Actuator module 100 may be controlled with quasi-static bias currents, so that at low frequency the relative lens position between the lens and image sensor is maintained. This accounts for the fact that the quasi-static information from the gyroscope has been removed. The orthogonal streams of angular data, appropriately integrated and filtered from the gyroscope, may then be transformed and mapped to account for any differences in the orientation of the gyroscope as compared to the movement axes of the OIS mechanism 204. The resulting data represents the changes in angle of the camera about axes that are orthogonal to the optical axis, and orthogonal to the line of action of each OIS movement direction (e.g., diagonally across the camera).

A further mapping associated with the amount of lens shift required to compensate for a given handshake tilt, and to account for the movement of the OIS mechanism associated for a given drive current, may then be performed. Each actuator module 100 may be calibrated for each movement direction, with these calibration values stored for each camera. In addition, there may also be a further mapping, potentially also calibrated for each actuator module 100, where a given change in tilt is actively applied to the lens for a given applied change in OIS mechanism position. In this way, a given drive to the linear OIS mechanism will produce a proportional drive to the tilting mechanism.

After these mapping operations, the movement for each OIS direction that corresponds with a given camera angle (imparted by handshake) is thus assessed. Based on this assessment, the drive signal corresponding with the negative of this movement is applied to each OIS axis (and potentially the associated tilt axis), as appropriate, to compensate for the handshake motion.

To realize these the various tilting, rotating and shifting movements described herein, the coils and magnets for both the AF mechanism and OIS mechanism are placed in the corners of actuator 100 and, in turn, the generally cuboid camera. Such positioning minimizes the size of the camera as compared to the size of lens 102. More specifically, the typically single AF coil is split into four separate bodies (e.g., AF coils 214A-214D), so as to avoid extending the coil around the sides of the lens carrier. This, in turn, maximizes the size of the lens carrier in the footprint of the camera. The advantages to such a configuration are that the current in one half of the coil is flowing in the opposite direction to the current in the other half, relative to the magnet. In order to maintain high space efficiency, it is therefore necessary to pole the two halves of the magnet in opposite directions, so that the resulting Lorentz force on each half of the coil is in the same direction. In one embodiment, the magnet is formed as a single structure with each half poled in opposite directions. In an alternative embodiment, the magnet can be split into two pieces, and each piece poled in opposite directions and then joined together. This same basic structure is repeated for the OIS magnet and coil arrangement in the corner, although mounted orthogonally, so as to generate the forces in the desired directions.

Figure 6:
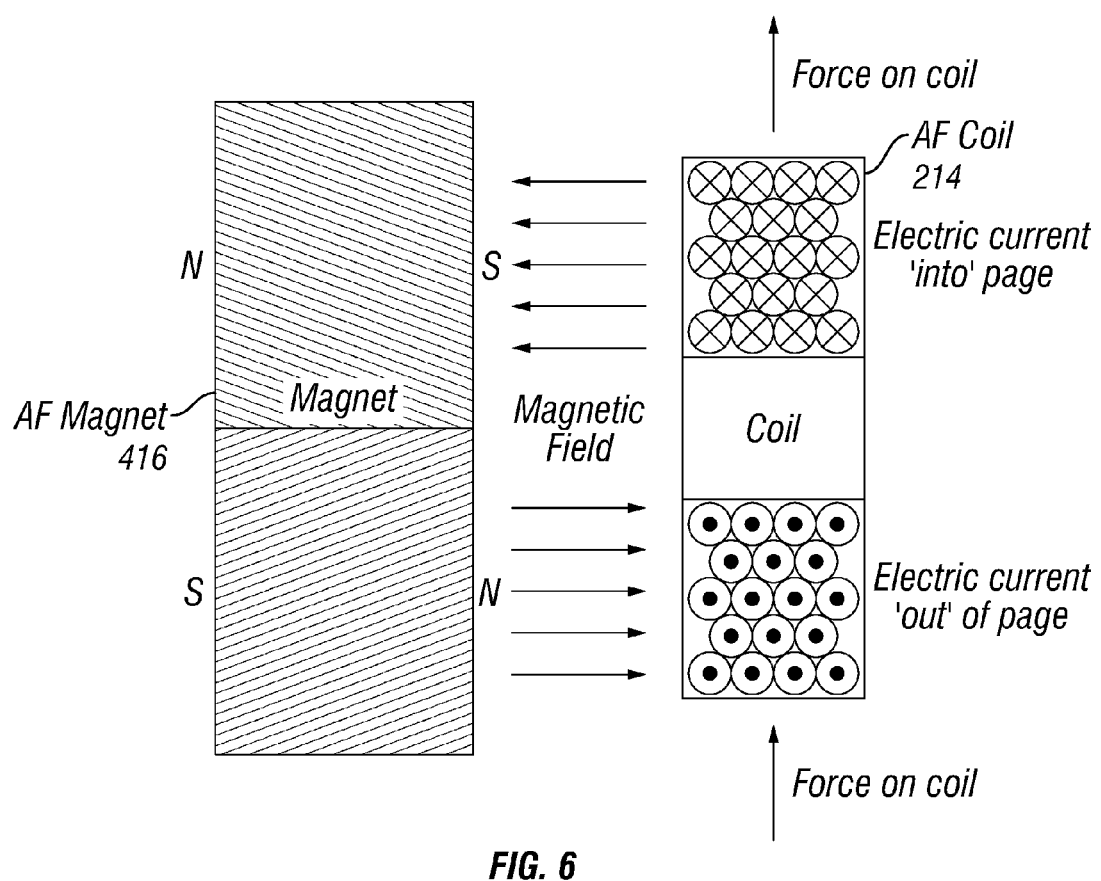
FIG. 6 is a schematic view of one embodiment of an actuator coil and magnet configuration.
Figure 7:
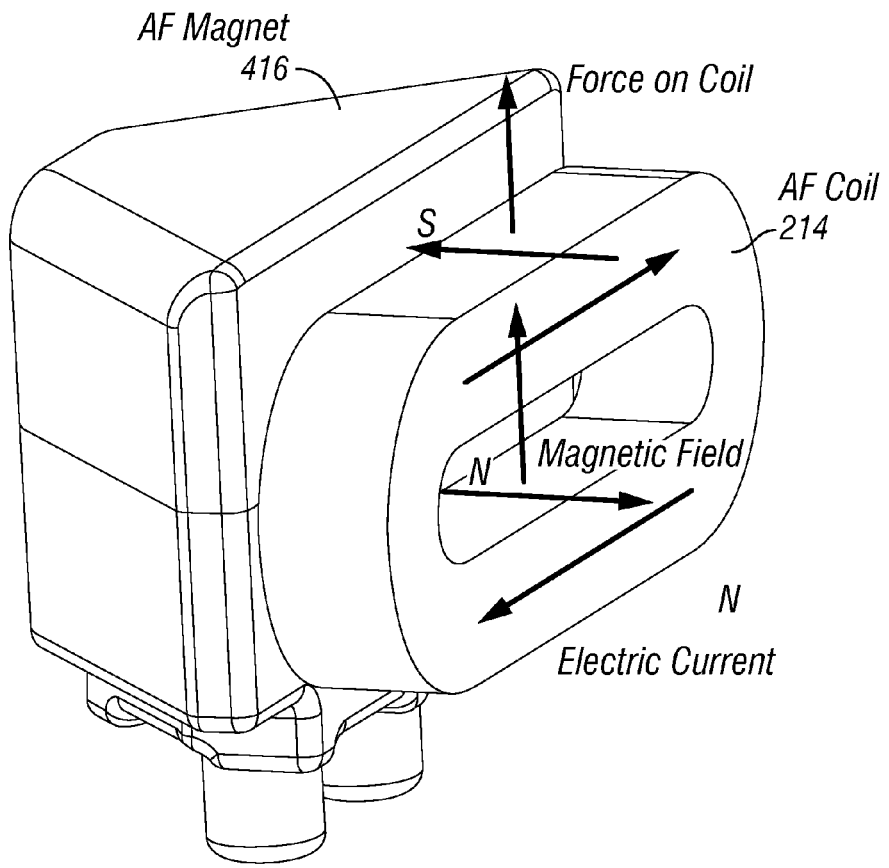
FIG. 7 is a perspective view of one embodiment of an autofocus actuator coil and magnet configuration.

This basic configuration is best illustrated in FIGS. 6 and 7. FIG. 6 is a schematic representation of an AF magnet and associated AF coil. FIG. 7 is a perspective view of the same basic actuator structure of FIG. 6. The AF magnet and AF coil are incorporated into actuator module 100 as previously discussed.

It can be seen in FIGS. 6 and 7 that the upper and lower halves of each AF magnet 416 (as viewed in the Figures) are poled in different directions. In this aspect, the upper part of each AF magnet 416 present a south pole to the associated AF coil 214, whereas the lower part presents a north pole (although the opposite poling is also contemplated).

Due to the relative orientation of each AF coil 214, it may be seen that the top half of AF coil 214 carries a current flowing 'into' the page in FIG. 6, and the bottom half of the AF coil 214 carries a current flowing 'out' of the page. Given the poling of AF magnet 416, this produces a net 'upward' Lorentz force on both halves of AF coil 214, relative to AF magnet 416. Reversing the direction of the current flow will reverse the direction of the Lorentz force.

FIG. 7 shows AF magnet 416 and AF coil 214 from one corner of the AF mechanism 202. It is to be understood, however, that the basic mechanism is identical for the AF magnet and AF coil in each corner of the AF mechanism.

Figure 8:
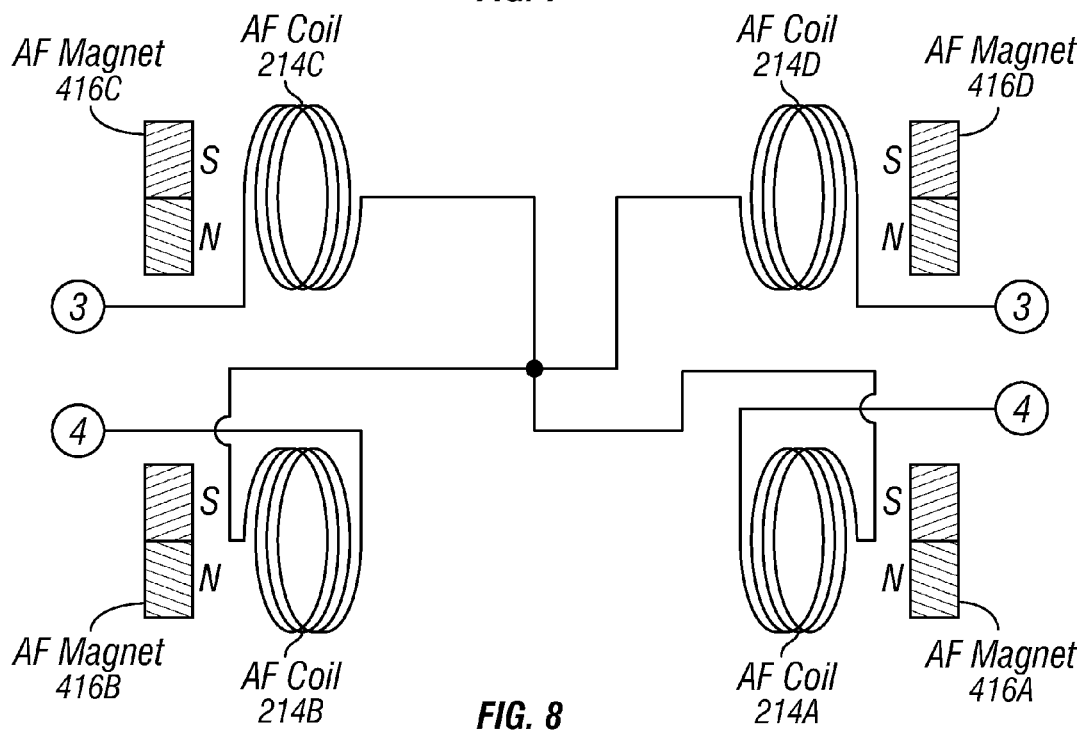
FIG. 8 is a schematic view of an electrical connection configuration of one embodiment of an autofocus coil and magnet configuration.
Figure 9A:
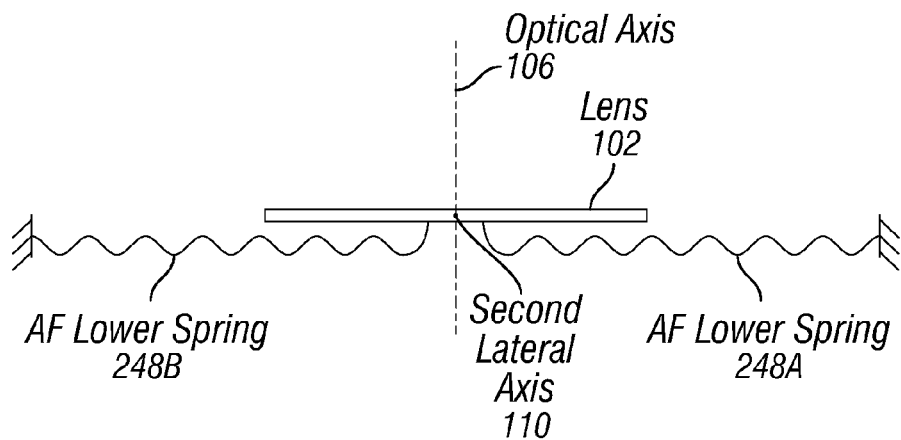
FIG. 9A is a cross sectional side view of one embodiment of a lens and spring assembly along a second lateral axis of an actuator module used during an autofocus operation.
Figure 9B:
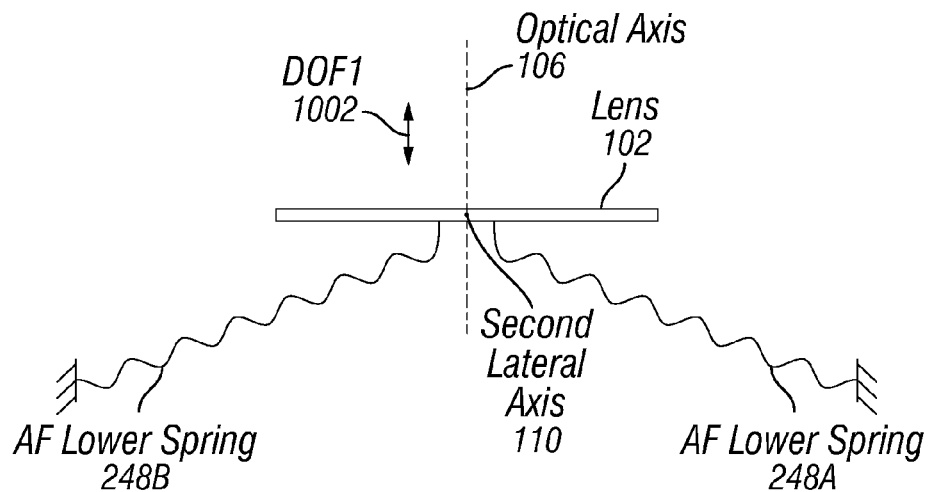
FIG. 9B is a cross sectional side view of one embodiment of a lens and spring assembly along a second lateral axis of an actuator module during an autofocus operation.
Figure 9C:
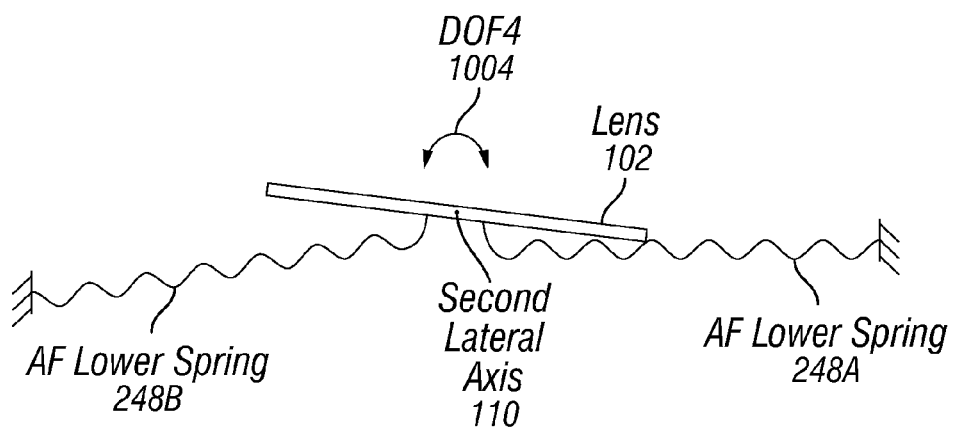
FIG. 9C is a cross sectional side view of one embodiment of a lens and spring assembly along a second lateral axis of an actuator module during a tilting operation.
Figure 9D:
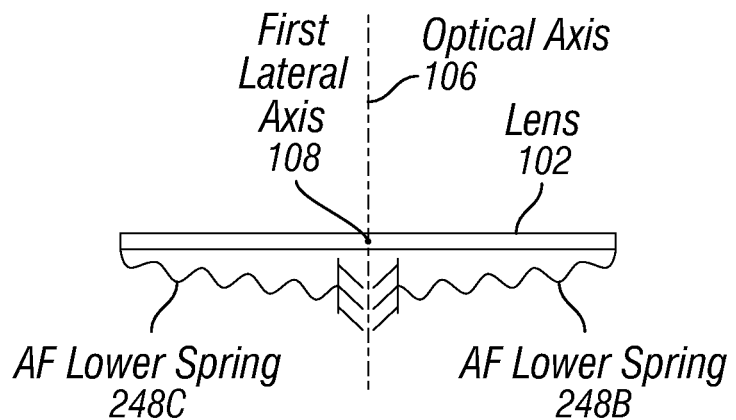
FIG. 9D is a cross sectional side view of one embodiment of a lens and spring assembly along a first lateral axis of an actuator module used during an autofocus operation.
Figure 9E:
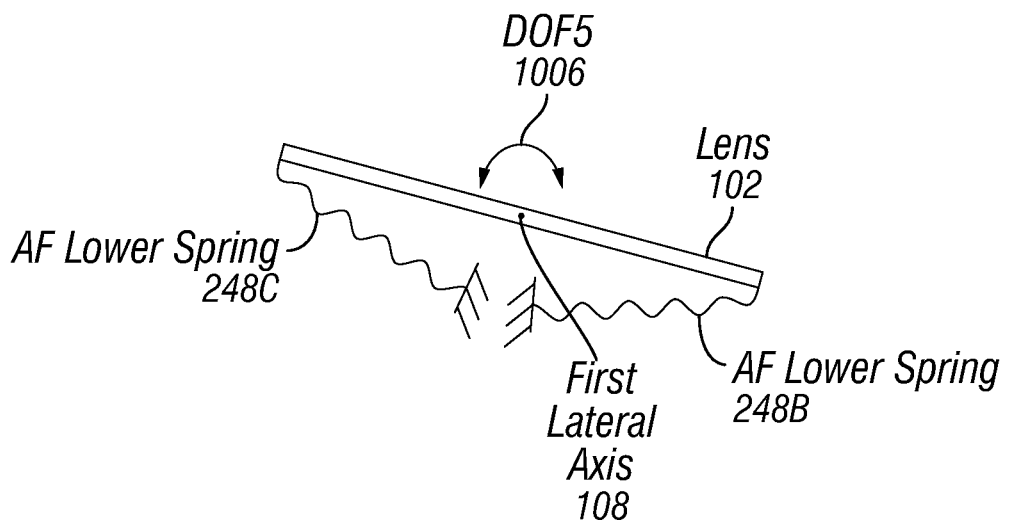
FIG. 9E is a cross sectional side view of one embodiment of a lens and spring assembly along a first lateral axis of an actuator module during a tilting operation.

FIG. 8 shows the connection scheme for the AF coils and Table 10 below shows an example of how the different connections can be used to drive the AF coils. Referring to FIG. 8, electrically, one terminal of each of AF coils 214A-214D is connected together, and the other terminal of each of AF coils 214A-214D is connected to one of the terminals of the corresponding AF lower spring (e.g., springs 248A-248D). In one embodiment, the AF coil terminals, which are all connected together, are all connected to the AF upper flexure 420, which acts to electrically connect all these terminals together. AF upper flexure 420 may be formed from a sheet material, for example, a sheet of metal material. In one embodiment, both AF upper flexure 420 and AF lower flexure 224, which includes the AF lower springs 248A-248D, are formed from sheets of material and are configured so that the notional planes of the sheets of the two spring members, when undeformed (i.e., in a resting state), are parallel to each other. AF upper flexure 420 and AF lower flexure 224 may be separated from each other along the optical axis so that one is mounted further from the image sensor and the other closer. When AF upper flexure 420 is driven, there are four separate parts to the drive signal that are driven sequentially. The frequency of cycling through these signals can be chosen so that it is a higher frequency than can cause vibrations of the lens carrier 212 that would degrade image quality, and ideally ultrasonic to avoid any acoustic noise.

For each drive pulse in the cycle, two of AF coils 214A-214D are driven, and hence two terminals are active and the remaining two terminals are held at high impedance (effectively open-circuit). Within each drive pulse various actual drive signals are possible. Representatively, there may be a linear drive current in which one terminal is at a drive voltage and the other connected to ground. Depending on the direction of the lens motion, the direction of current flow can be changed. In this aspect, either terminal could be at the drive voltage with the other grounded. This may mean that the analogue output of the driver may include an H-bridge to allow for driving current in both directions. Still further, the drive signal may be a pulse width modulated (PWM) drive signal in which the direction of current flow may be altered depending on the direction of travel. The AF coils 214A-214D may, however, be driven from a constant voltage supply, with the VCM force controlled by the current 'on' time during one or more pulses (depending on the PWM drive frequency).

An exemplary drive scheme is illustrated in Table 1 below.

| Terminal 1 | Terminal 2 | Terminal 3 | Terminal 4 |
|---|---|---|---|
| +ve | −ve | Hi Imp | Hi Imp |
| Hi Imp | Hi Imp | −ve | +ve |
| +ve | Hi Imp | −ve | Hi Imp |
| Hi Imp | −ve | Hi Imp | +ve |

The drive scheme as illustrated in Table 1 shows that for each of the four drive pulses, two of AF coils 214A-214D that are adjacent to each other are driven. In this way, when two such AF coils (e.g., 214A and 214D or 214B and 214C) are driven, they impart a force on the lens carrier 212 along the optical axis. This force is offset from the net reaction force from the spring flexures, for example AF upper springs 422A-422B and AF lower springs 248A-248D, which therefore also applies a torque to the lens carrier 212 about a first axis.

In the next (or previous) pulse, the two of AF coils (e.g., 214A and 214D or 214B and 214C) on the opposite side of the lens carrier 212 are driven. For the nominal design, if the two opposite pairs of AF coils (e.g., AF coils 214A and 214D) are driven with the same signal, the torques will cancel out, meaning no net tilt to the lens carrier 212. However, if there is an offset between the two signals, there will be a net torque which tends to tilt (or rotate) the lens carrier 212 about the first axis (e.g., axis 108).

In the following (and/or previous) pair of pulses, two of the AF coils 214A-214D are mated with their adjacent AF coils 214A-214D on the other sides, so as to allow the lens carrier 212 to tilt around a second axis (e.g., axis 110), which is orthogonal to the first axis (e.g., axis 108). This scheme allows all four AF coils 214A-214D to be driven, and three degrees of freedom (e.g., movement parallel to the optical axis (DOF1), rotation about the first lateral axis 108 (DOF4) and rotation about the second lateral axis 110 (DOF5)) to be controlled with only a total of four external electrical connections. Alternatively, a linear drive scheme may be used in which each of AF coils 214A-214D are driven at the same time.

An exemplary drive scheme for OIS operation (e.g., shift the lens carrier, and associated lens, according to DOF2 and DOF3 to compensate for user handshake) will now be described. For example, in one embodiment, all four OIS coils 512A-512D are electrically connected together so that coils in the opposite corners are connected electrically in series. One pair of diagonally opposite OIS coils (e.g. OIS coils 512D and 512B) is driven from an entirely independent current source driver from the other pair (e.g. OIS coil 512A and 512C). Thus, electrically, the OIS system looks like 'two' separate coils, with separate current sources. A particular drive current may then correspond to a particular position. Representatively, in one embodiment, the drive scheme is a first order simple drive scheme in which the drive current is proportional to the desired position. Other more complex models are possible, including corrections for hysteresis and linearity, and potentially the dynamics of the system when operating at higher frequencies.

Figure 10A:
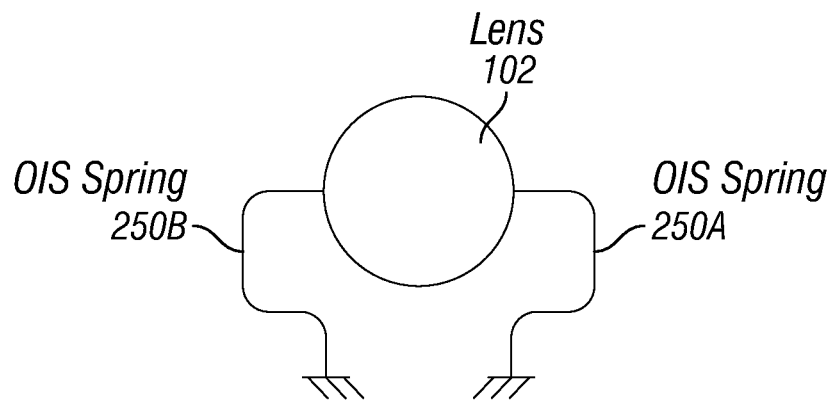
FIG. 10A is a top view of one embodiment of a lens and spring assembly of an actuator module used during an optical image stabilization operation.
Figure 10B:
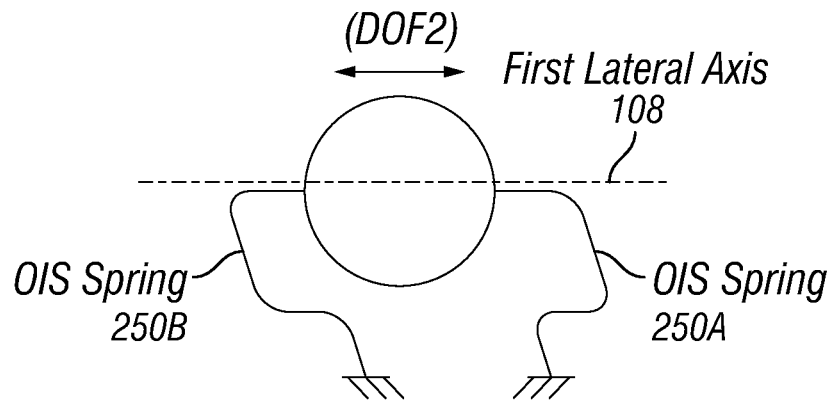
FIG. 10B is a top view of one embodiment of a lens and spring assembly of an actuator module during a shifting operation along a first lateral axis.
Figure 10C:
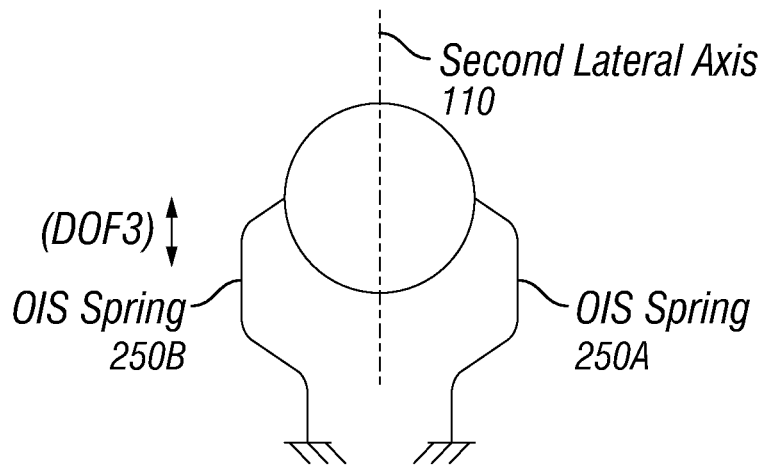
FIG. 10C is a top view of one embodiment of a lens and spring assembly of an actuator module during a shifting operation along a second lateral axis.

Movement of the lens according to each of DOF1-DOF5 will now be described in reference to FIGS. 9A-9E and FIGS. 10A-10C. Representatively, FIGS. 9A-9E illustrate cross sectional side views of a lens attached to some of the AF lower springs of the AF mechanism 202. FIGS. 10A-10C illustrate cross sectional side views of a lens attached to some of the OIS springs of the OIS mechanism 204. It is noted that not all of the springs and other components forming the AF mechanism 202 and OIS mechanism 204 are shown for ease of illustration and understanding of the configuration and movement of the springs and moving lens, however, are present according to the embodiments previously discussed.

Representatively, FIG. 10A illustrates a side cross sectional view along second lateral axis 110, thus from this view AF lower springs 248A and 248B are shown connected to lens 102. Although not shown for ease of illustration, lens 102 may be held within lens carrier 212 and the AF lower springs 248A and 248B attached to a portion of the lens carrier 212. In FIG. 10A, actuator module 100 may be in a resting state (e.g., no power is being applied) such that lens 102 is in a substantially horizontal position and AF lower springs 248A and 248B are substantially undeformed. Actuator module 100 may be actuated (e.g., power applied) during, for example an autofocus operation such that lens 102 moves in a direction parallel to optical axis 106 as illustrated in FIG. 10B. In other words, lens 102 moves up (or down) according to DOF 1 as illustrated by arrow 1002. AF lower springs 248A and 248B in turn are deformed (e.g. stretched) in either an upward (or downward) direction as shown. As previously discussed, AF mechanism 202 may also be used to tilt lens 102. Representatively, as illustrated in FIG. 10C, which is also a view along second lateral axis 110, when lens 102 is rotated about second lateral axis 110 as illustrated by arrow 1004, it tilts such that AF lower spring 248B deforms in an upward direction and AF lower spring 248A remains in a substantially undeformed (e.g. horizontal) configuration. Rotation about second lateral axis 110, as illustrated by arrow 1004, achieves lens 102 movement according to DOF4. FIG. 10D illustrates another cross sectional view of the AF lower springs and lens associated with AF mechanism 202, however, this view is along first lateral axis 108 so that DOF5 can be shown. Representatively, from this view along first lateral axis 108 AF lower spring 248B and 248C can be seen connected to lens 102. FIG. 10D illustrates these aspects when actuator 100 is in a resting state thus lens 102 and AF lower springs 248B and 248C are in a substantially horizontal, undeformed orientation. Once a power is applied, lens 102 may be rotated about first lateral axis 108 as shown by arrow 1006 such that lens 102 tilts and AF lower spring 248C deforms (e.g. stretches) in an upward direction while AF lower spring 248B remains in a substantially resting, undeformed position (e.g., horizontal). Rotation about first lateral axis 108, as illustrated by arrow 1006, achieves lens 102 movement according to DOF5.

FIGS. 10A-10C illustrate a top view of lens 102 connected to two of the OIS springs, namely OIS springs 250A and 250B. FIG. 10A illustrates lens 102 and OIS springs 250A and 250B in a resting position in which lens 102 is not being shifted according to an OIS operation. FIG. 10B illustrates shifting of lens 102 in a direction parallel to first lateral axis 108 to achieve DOF2. Representatively, lens 102 is shifted to the left (or right) such that OIS springs 250A and 250B are modified from their substantially "L" shaped resting configuration to accommodate the lens shift. FIG. 10C illustrates shifting of lens 102 in a direction parallel to second lateral axis 110 to achieve DOF3. Representatively, lens 102 is shifted in a backward (or forward) direction such that OIS springs 250A and 250B deform (e.g. expand) to accommodate the lens shift. Although OIS springs 250C and 250D are not illustrated, it is to be understood that a configuration of the remaining springs would be deformed in a similar manner depending upon the direction in which lens 102 shifts.

An exemplary process for assembling actuator module 100 and operating actuator module 100 has been described herein. It is to be understood, however, that these are only exemplary processes for assembling and operating actuator module and that any one or more of the steps may be performed in a different order, or other processes may be suitable to achieve the same results.

Figure 11:
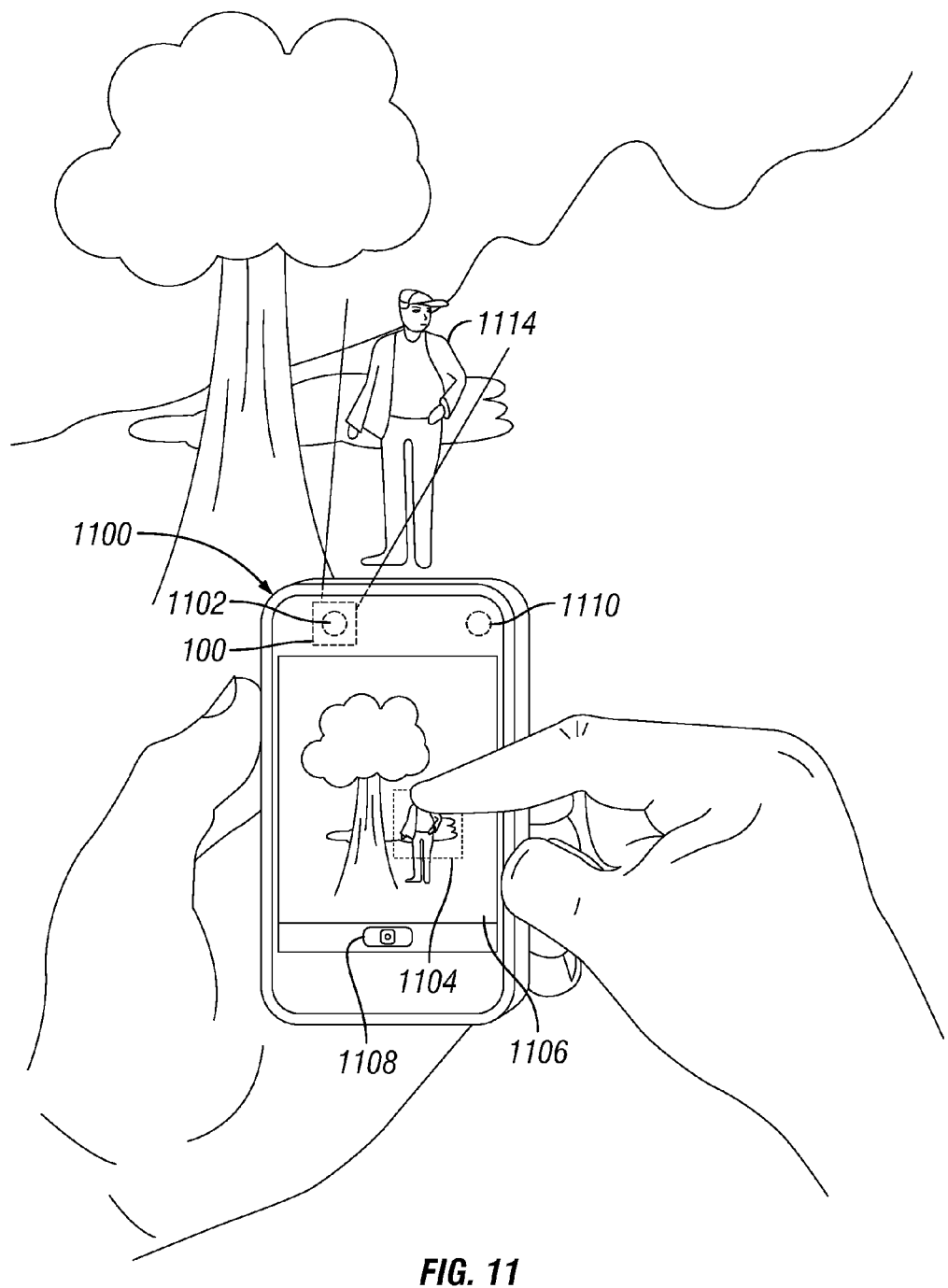
FIG. 11 is a perspective view of one embodiment of an implementation of an actuator module within a mobile device.

FIG. 11 illustrates one implementation of the actuator described herein. Representatively, actuator module 100 may be mounted within a miniature camera contained within a mobile electronic device 1100. Here, the user is making a manual or touch selection on the touch screen viewfinder, which is previewing an object of interest 1114, at which the camera lens system 1102, having actuator module 100 therein, is aimed. The selection may be in the form of a target graphic 1104 such as a contour that may be drawn by the user on the touch screen 1106. Alternatively, the selection or target graphic 1104 may be a fixed frame or a fixed solid area that moves with the user's finger across the screen 1106. During an AF operation, the actuator module 100 moves the lens element mounted therein so that the object of interest 1114 is in focus, e.g., according to DOF1. Actuator module 100 may also move the lens element to compensate for lens sag, which could be caused by the user tilting the mobile device while trying to capture an image. Such movement could be according to DOF4 or DOF5. Still further, actuator module 100 may shift the lens element during an OIS operation to compensate for user handshake, e.g., according to DOF2 and/or DOF3. A flash element 1110 may further be provided to illuminate the object of interest 1114. Once the user determines that the object of interest 1114 is in focus, the user can capture the image by pressing virtual shutter button icon 1108.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the actuator is described for use in a miniature camera, it is contemplated that the size and dimensions of the actuator can be scaled to accommodate any size camera or other device requiring movement of a lens or other component similar to that caused by the actuator described herein. Still further, although use of the actuator in a mobile device is disclosed, it is further contemplated that the actuator may be used to drive movement of a lens element within any kind of camera, e.g., still and/or video, integrated within any kind of electronic device or a camera that is not integrated into another device. Representative non-mobile devices may include a desktop computer, a television or the like. The description is thus to be regarded as illustrative instead of limiting.

What is claimed is:

1. A lens actuator module comprising:
an autofocus (AF) mechanism operable to move a lens according to at least three degrees of freedom during an AF operation, the AF mechanism having a coil and a magnet assembly for driving movement of the lens according to the at least three degrees of freedom;
an optical image stabilization (OIS) mechanism operable to move the lens according to at least two degrees of freedom during an OIS operation, the at least two degrees of freedom different from the at least three degrees of freedom, the OIS mechanism having a coil and a magnet assembly for driving movement of the lens according to the at least two degrees of freedom; and
a flexure assembly positioned between the AF mechanism and the OIS mechanism, the flexure assembly having a set of AF springs attached to the AF mechanism to allow for movement of the AF mechanism and a set of OIS springs attached to the OIS mechanism to allow for movement of the OIS mechanism.

2. The lens actuator module of claim 1 wherein the coil and magnet assembly of the AF mechanism comprises at least four separate coils that may be driven with an electric current and at least four separate magnets, wherein the coils and the magnets together control the focus position of the lens.

3. The lens actuator module of claim 1 wherein the at least three degrees of freedom comprise movement of the lens in a direction parallel to an optical axis of the lens relative to an image sensor, and rotation of the lens relative to the image sensor about two axes orthogonal to the optical axis.

4. The lens actuator module of claim 2 wherein the four separate coils are mounted on the lens or a lens carrier, and the four magnets are mounted on a fixed support structure of the AF mechanism.

5. The lens actuator module of claim 1 wherein the coil and magnet assembly of the OIS mechanism comprises at least four separate coils and at least four separate magnets, wherein the coils and the magnets together move the lens to compensate for user handshake.

6. The lens actuator module of claim 1 wherein the at least two degrees of freedom comprise movement of the lens in at least two different directions orthogonal to an optical axis.

7. The lens actuator module of claim 1 further comprising:
an upper spring assembly to suspend the lens or a lens carrier on the AF mechanism.

8. The lens actuator module of claim 1 wherein each magnet comprises at least two regions that are poled in opposite directions so as to generate Lorentz forces in the same direction on both sides of each corresponding coil.

9. The lens actuator module of claim 1 wherein the OIS mechanism further comprises:
a plurality of ball bearings positioned between a moving portion of the OIS mechanism and a fixed portion of the OIS mechanism to minimize parasitic motions of the OIS mechanism and limit OIS mechanism movements to directions orthogonal to an optical axis of the lens.

10. The lens actuator module of claim 9 wherein the plurality of ball bearings are maintained in contact with the moving portion and the fixed portion by a magnetic attraction between OIS mechanism magnets of the magnetic assembly, which are mounted on the moving portion of the OIS mechanism, and a magnetic material the forms part of the fixed portion of the OIS mechanism.

11. The lens actuator module of claim 1 wherein the actuator module is dimensioned for use within a miniature camera of a hand-held device.

12. A lens actuator module comprising:
an autofocus (AF) mechanism capable of moving a lens according to at least three degrees of freedom, the AF mechanism comprising (1) a first portion having a plurality of AF coils positioned around a lens carrier, and (2) a second portion having a plurality of AF magnets positioned within a yoke member, wherein the yoke member is positioned around the second portion such that the AF magnets are along a side of the AF coils opposite the lens carrier and the first portion is movable with respect to the second portion;

an optical image stabilization (OIS) mechanism operable to move the lens according to at least two degrees of freedom, the at least two degrees of freedom different from the at least three degrees of freedom, the OIS mechanism comprising (1) a base member having a plurality of OIS coils positioned around the base member, wherein the OIS coils are orthogonal to the AF coils, and (2) a plurality of OIS magnets attached to a bottom side of the first portion and positioned over the OIS coils so as to move the first portion according to the at least two degrees of freedom with respect to the base member; and a flexure assembly positioned between the AF mechanism and the OIS mechanism, the flexure assembly having a set of AF springs attached to the AF mechanism to allow for movement of the AF mechanism and a set of OIS springs attached to the OIS mechanism to allow for movement of the OIS mechanism.

* * * * *